United States Patent [19]
Klimash et al.

[11] Patent Number: 6,020,457
[45] Date of Patent: Feb. 1, 2000

[54] DISULFIDE-CONTAINING DENDRITIC POLYMERS

[75] Inventors: June W. Klimash; Herbert M. Brothers, II; Douglas R. Swanson, all of Midland, Mich.; Rui Yin, Bel Air, Md.; Ralph Spindler; Donald A. Tomalia, both of Midland, Mich.; Yong Hsu, Woodbury, Minn.; Roberta C. Cheng, Midland, Mich.

[73] Assignee: Dendritech Inc., Midland, Mich.

[21] Appl. No.: 08/941,527

[22] Filed: Sep. 30, 1997

Related U.S. Application Data
[60] Provisional application No. 60/024,734, Sep. 30, 1996.

[51] Int. Cl.$^7$ ............................. C08G 69/00; C08G 73/00
[52] U.S. Cl. ......................... 528/373; 528/363; 528/397; 525/410; 525/419; 424/DIG. 16
[58] Field of Search ..................................... 528/397, 373, 528/363; 525/410, 419; 424/DIG. 16

[56] References Cited

U.S. PATENT DOCUMENTS

| | | | |
|---|---|---|---|
| 3,485,658 | 12/1969 | Iler | 117/69 |
| 4,568,737 | 2/1986 | Tomalia et al. | 528/363 |
| 4,587,329 | 5/1986 | Tomalia et al. | 528/363 |
| 4,681,799 | 7/1987 | Engle | 428/220 |
| 4,694,064 | 9/1987 | Tomalia et al. | 528/332 |
| 4,778,720 | 10/1988 | Engel | 428/336 |
| 4,847,328 | 7/1989 | Hutchins et al. | 525/107 |
| 4,851,477 | 7/1989 | Hutchins et al. | 525/123 |
| 4,941,997 | 7/1990 | Decher et al. | 252/586 |
| 4,966,743 | 10/1990 | Engel | 264/298 |
| 4,973,429 | 11/1990 | Decher et al. | 252/587 |
| 5,035,762 | 7/1991 | Wegner et al. | 156/230 |
| 5,035,763 | 7/1991 | Wegner et al. | 156/230 |
| 5,068,318 | 11/1991 | Decher et al. | 534/573 |
| 5,150,446 | 9/1992 | Penner et al. | 385/122 |
| 5,208,111 | 5/1993 | Decher et al. | 428/420 |
| 5,247,602 | 9/1993 | Penner et al. | 385/122 |
| 5,731,095 | 3/1998 | Milco et al. | 528/288 |
| 5,773,527 | 6/1998 | Tomalia et al. | 525/417 |

OTHER PUBLICATIONS

Buildup Of Ultrathin Multilayer Films By A Self–Assembly Process: III. Consecutively Alternating Adsorption Of Anionic And Cationic Polyelectrolytes On Charge Surfaces, G. Decher, J.D. Hong and J. Schmitt, Thin Solid Films, 210/211 (1992) 831–8325, The month in the date of publication is not available.

Molecular Self–Assembly Of Conducting Polymers: A New Layer–by–Layer Thin Film Deposition Process, J.H. Cheung, A.F. Fou, M. Ferreira and M.F. Rubner, Dept. of Materials Science and Engineering, pp. 757–758, The date of publication is not available.

Fine–Tuning Of The Film Thickness Of Ultrathin Multilayer Films Composed Of Consecutively Alternating Layers Of Anionic and Cationic Polyelectrolytes, G. Decher and J. Schmitt, Progr. Colloid Polym Sci 89:160–164 (1992), The month in the date of publication is not available.

Starburst Dendrimers: Molecular–Level Control Of Size, Shape, Surface Chemistry, Topology, and Flexibility Form Atoms To Macroscopic Matter, Donald A. Tomalia, Adel M. Naylor and William A. Goddard III, Angew. Chem. Int. Ed. Engl. 29 (1990) 138–175, The month in the date of publication is not available.

Molecular Monolayers and Films, J.F.Swalen, D.L. Allara, J.D. Andrade, E.A. Chandross, S. Garoff, J. Israelachvili, T.J. McCarthy, R. Murray, R.F. Pease, J.F. Rabolt, K.J. Wynne, and H. Yu, Langmuri 1987, 3, 932–950, The month in the date of publication is not available.

Buildup Of Ultrathin Multilayer Films By A Self–Assembly Process, 1 Consecutive Adsorption Of Anionic and Cationic Bipolar Amphiphiles On Charged Surfaces, Gero Decher and Jong–Dal Hong, Makromol. Chem. Macromol. Symp. 46, 321–327 (1991), The month in the date of publication is not available.

Cascade (Starburst™) Dendrimer Synthesis By The Divergent Dendron/Divergent Core Anchoring Methods, Donald A. Tomalia, Douglas R. Swanson, June W. Klimash and Herbert M. Brothers, III pp. 52–53, The date of publication is not available.

Dendrimer and Polystyrene Surfactant Structure At The Air–Water Interface, P.M. Saville and J.W. White, C.J. Hawker, K.L. Wooley and J.M.J. Frechet, J. Phys. Chem. 1993, 97, 293–294, The month in the date of publication is not available.

(List continued on next page.)

Primary Examiner—P. Hampton-Hightower
Attorney, Agent, or Firm—Price, Heneveld, Cooper, Dewitt & Litton

[57] ABSTRACT

Dendritic polymers containing disulfide functional groups which are essentially inert under non-reducing conditions, but which form sulfhydryl groups upon being subjected to a reducing agent are prepared by synthesizing dendritic polymers having a core with a disulfide linkage or by reacting a dendritic polymer with a molecule containing a disulfide linkage and reactive terminal groups. In one aspect of the invention, dendritic polymers having a single disulfide functional group at the core are provided. The single disulfide group at the core can be reduced to form two sulfhydryl groups to which other molecules, such as proteins, oligonucleotides, peptides, hormones, other dendritic polymers, non-dendritic polymers, etc., can be bound. Applications for the disulfide functionalized dendritic polymers include formation of differentiated dendrimers, formation of binding reagents for diagnostics, drug delivery, gene therapy and magnetic resins imaging, and in the preparation of self-assembled dendrimer monolayers on a quartz crystal resonators to provide dendrimer-modified electrodes which are useful for detecting various ions or molecules. In another aspect of the invention, dendritic polymers having sulfhydryl terminals are provided. The sulfhydryl terminated dendritic polymers can be used to prepare stable, curable resins composition which can undergo cross linking when subjected to a reducing agent.

49 Claims, 24 Drawing Sheets

OTHER PUBLICATIONS

Division Of Inorganic Chemistry, Bruce E. Bursten, American Chemical Society, The date of publication is not available.

Assembly, Structural Characterization, and Thermal Behavior of Layer–by–Layer Deposited Ultrathin Films Of Poly(vinyl sulfate) and Poly(allylamine), Yuri Lvov, Gero Decher, and Helmuth Mohwald, Langmuir 1993, 9, 481–486, The month in the date of publication is not available.

NaPSS / PAA

SCHEME I

Synthesis of Dendrimer-fluorescein derivatives

1) Dendrimer : DTAF = 1:1
2) Dendrimer : DTAF = 1:10
3) Dendrimer : DTAF = 1:192

SCHEME III
Cystamine Core Dendrimer Films

DISULFIDE-CONTAINING DENDRITIC POLYMERS

Applicants hereby claim the priority benefits under the provisions of 35 U.S.C. §119, basing said claim of priority on U.S. patent application Ser. No. 60/024,734, filed Sep. 30, 1996.

FIELD OF THE INVENTION

This invention relates to dendritic polymers.

BACKGROUND OF THE INVENTION

Dendritic polymers have been successfully incorporated as biological binding reagents in immunoassay systems, and have demonstrated assay performance, such as in radial partition immunoassay formats, which is equivalent or superior to systems incorporating conventional binding reagents such as polystyrene beads. The benefits which have been achieved by incorporating dendritic polymer binding reagents in immunoassay systems include increased assay sensitivity, greater precision, and reduced time required for analysis. However, the potential for successfully utilizing conventional dendritic polymers as biological binding reagents in certain biomedical or diagnostic applications is, to an extent, limited by the statistical distribution of different degrees of substitution found in dendritic polymer conjugates prepared by attachment of biological compounds to the surface groups of the dendritic polymer. In surface conjugations, different degrees of substitution and positional isomers may elicit different chemical and/or biological responses in certain applications and may yield unexceptably broad peaks or bands when subjected to separation techniques, such as chromatography or electrophoresis.

Differentiated polyamidoamine (PAMAM) dendrimers having heterogenous surface-groups topologically confined in a fixed region on the surface with respect to each other have been prepared from a reactive initiator core reagent, such as dibenzyl amine, using conventional divergent synthesis techniques. After the desired generation of growth has been achieved, the surface amino groups of the PAMAM dendron are completely blocked by the addition of two alkyl epoxides per terminal amino group. The benzyl groups at the core are then cleaved by hydrogenation to generate a primary amino group, which can then act as an initiating site for growth of two additional PAMAM dendrons. The additional dendrons can be synthesized or grown to any desired generation and can be subsequently subjected to surface modifications to provide surface or terminal groups which are different from those of the first synthesized dendron having the alkyl functional groups.

Differentiated dendrimers have also been prepared by reacting a multiple functional anchoring core with a plurality of different dendrons prepared by divergent controlled synthesis involving iterative sequencing, upon a monoamine focal compound (e.g., an amino alcohol), of methacrylate and ethylene diamine according to the usual branch cell method used in preparing PAMAM type dendritic polymers. The dendrons can be individually synthesized to any desired generation and can be individually modified to provide any of various different types of functional groups (e.g., hydroxyl, mercapto, nitrile, amide, carboxylic, etc.) prior to being combined with the anchoring core.

A disadvantage with the first method, involving blocking of amine groups with an alkyl epoxide, is that the resulting differentiated dendrimers are limited to those having one sector or portion of the dendritic polymer surface comprised of alkyl terminals and only one other section comprised of different terminal groups. Thus, this first method cannot be used for preparing differentiated dendritic polymers having two different homogeneous sectors which each have reactive functional groups at the surface, or any other type of differentiated dendritic polymer which does not have a homogenous surface sector which is comprised of alkyl terminal groups.

The second method of preparing differentiated dendrimers generally involves reacting dendrons having hydroxy focal groups with a multi-functional anchoring core, such as terephthaloyl chlorides, isophthaloyl chlorides or 1,3,5-benzene tricarbonyl chloride, in a volatile organic solvent, such as dichloromethane. The use of dichloromethane and other volatile carcinogenic compounds is undesirable on account of the health risks, hazardous waste management and disposal issues, and potential liability associated with their use. Also, a statistical distribution of products are formed which are difficult to purify.

Ultrathin or nano-sized films having a thickness from a few nanometers (a mono layer) to several hundred nanometers have been shown to be useful in various applications such as in optical devices, in electrical devices, catalyst systems, sensors, biosensors, and as biocompatable coatings. Nano-sized films have most commonly been prepared using the Langmuir-Blodgett (L-B) technique, in which multiple layered thin films are prepared by sequential transfer of monolayers from a water surface to a solid substrate. The L-B technique has been recognized as being undesirable because of the relatively expensive apparatus required and because the method and apparatus are only capable of coating small support surfaces. L-B technique is also considered to be relatively difficult and complicated.

Another method for forming ultrathin films involves the construction of multiple layers through ionic interactions of linear polyelectrolytes. Specifically, the film is comprised of one or more layers made of organic materials (e.g., polyelectrolytes) which in each layer contain ions of the same charge, the ions of the first layer having the opposite charge of a modified support, and in the case of multiple layers, each further layer having the opposite charge of the previous layer. The method involves modifying a support so that the support carries ions or ionizable compounds of the same charge over the entire surface of the support, and applying one or more layers made of organic materials, the organic materials in each layer having ions of the same charge, the organic material being applied from a solution of the organic materials to the modified support. Heretofore, the organic materials forming the layers on the support have been limited to monomeric substances having two ionic or ionizable functional groups of the same charge or conventional linear polymers containing a plurality of ionic or ionizable functional groups, i.e., linear ionomers or polyelectrolytes.

Ultrathin films formed by the method of applying ionic or ionizable monomeric or linear polymeric materials have certain disadvantages and limited applications. Because some of the functional groups of linear polyelectrolytes are buried inside of the polyelectrolyte, the resulting thin films formed using polyelectrolytes are not as strongly adsorbed onto the support surface as would otherwise be possible if all of the functional groups were available on the surface of the organic materials forming the layers of the ultrathin film. With conventional linear polyelectrolytes and monomeric electrolytes, it is not generally convenient to attach electrically, optically or biochemically active functional groups to the organic materials forming the layers of the ultrathin film prior to adsorption of these organic materials to the support surface. Conventional organic materials which have been employed in the formation of ultrathin films such as bola amphiphiles and linear polyelectrolytes, using the method of applying ionic or ionizable materials to a support, results in ultrathin films which are not inherently biocompatible, and which must be coated with biocompatible materials, such as heparin, to increase biocompatibility. Such attempts to improve biocompatibility involve additional steps and additional materials which add to the expense of a product utilizing these films, and do not always provide an acceptable level of biocompatibility. A further disadvantage with conventional ultrathin films is that they do not inherently include a first type of functional group which can be used for attachment to the support or an adjacent layer of the film and a second type of functional group which is available for subsequent adsorption or conjugation, such as with a biological compound.

SUMMARY OF THE INVENTION

This invention pertains to dendritic polymers containing disulfide functional groups which are essentially inert until reduced to sulfhydryl groups, after which the sulfhydryl groups can be reacted with various compounds to form a variety of novel compounds having unique properties, characteristics and applications.

DESCRIPTION OF THE PREFERRED EMBODIMENTS

Figure 1:
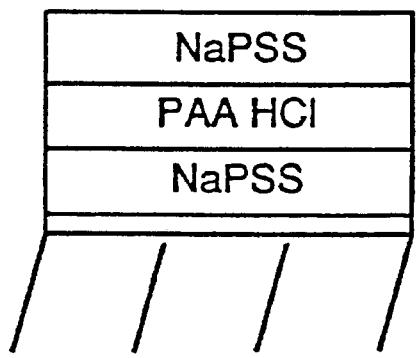
FIG. 1 is a graph of ultraviolet absorbance versus number of layers for a multilayer film of polystyrenesulfonate and poly(allylamine hydrochloride)
Figure 1:
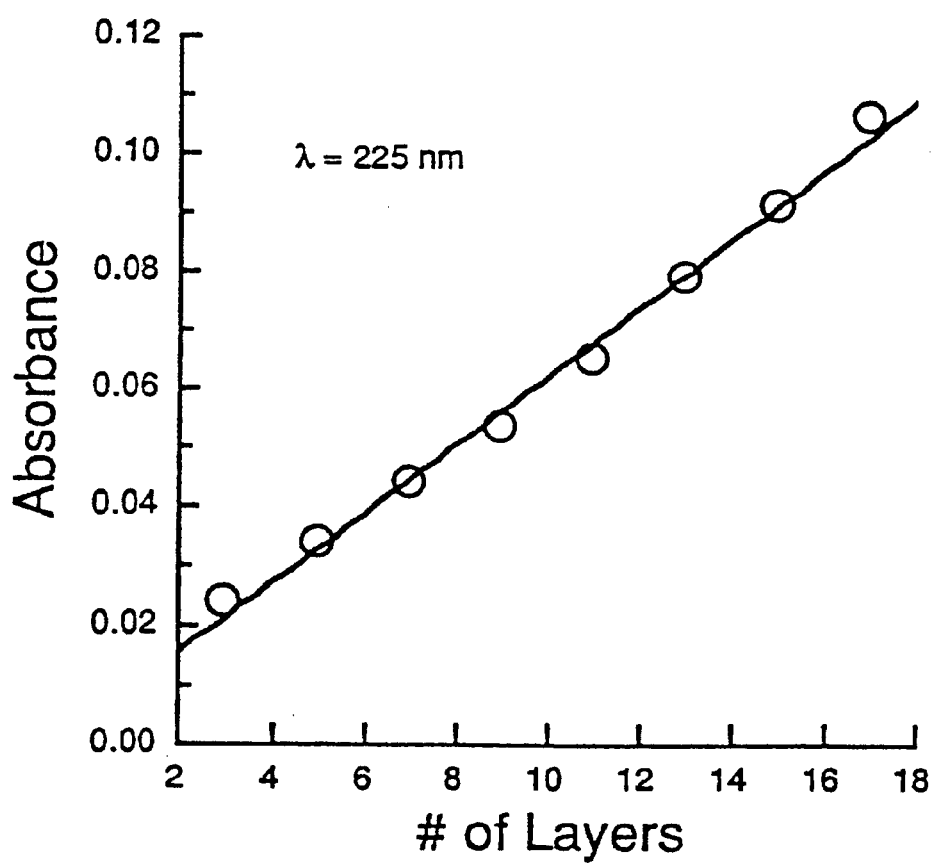

In accordance with one aspect of the invention, dendritic polymers having a single disulfide functional group at the core are provided. These dendritic polymers having a single disulfide functional group at the core can be of generally any desired generation and can include any of a variety of different surface functional groups. The single disulfide group at the core can be reduced to form two sulfhydryl groups and split the dendritic polymer molecule into two parts, each having a single reactive sulfhydryl group to which other molecules, such as proteins, oligonucleotides, peptides, hormones, other dendritic polymers, non-dendritic (e.g., linear or branched) polymers, etc., can be bound. The remaining surface groups (which can, for example, be amines, carboxylates, hydroxyl, etc.) may be used for signal amplification, attachment to surfaces, analyte interaction, further conjugation, etc.

Because dendritic polymers, especially dendrimers of generally any generation, can be prepared having a very narrow molecular weight distribution, and hence a very narrow particle size distribution, and can be readily subjected to surface modification, it is possible to produce disulfide functionalized dendritic polymers having properties customized to provide optimum performance in a variety of specific applications. Applications for the disulfide functionalized dendritic polymers include formation of differentiated dendrimers having heterogeneous surface-group topology confined in a fixed region on the surface, formation of ultrathin dendritic polymer-containing films for use in biological sensing devices, formation of binding reagents for diagnostics, drug delivery, gene therapy, and magnetic resonance imaging, and in the preparation of self-assembled dendritic monolayers on a quartz crystal resonator to provide dendritic polymer-modified electrodes useful for detecting various ions or molecules which can selectively bind to the dendrimer surface.

In accordance with another aspect of the invention, dendritic polymers having sulfhydryl terminal or surface groups are provided. The sulfhydryl terminated dendritic polymers may be prepared by terminating a dendritic polymer with a compound containing a disulfide functional group and subsequently reducing the disulfide group or by reacting with a reagent that produces a free thio group (such as Traut's reagent). The dendritic polymers having terminals containing disulfide functional groups can be used to prepare stable, curable resin compositions which can undergo cross-linking when subjected to a relatively mild reducing agent and subsequent oxidation to form inter-molecular disulfide linkage.

The dendritic polymers of this invention can, in general, be prepared using either of the well-known synthesis schemes, i.e., the convergent approach or the divergent approach. Any of the known reaction methods including the one-pot method, the protect-deprotect method, or the excess reagent method can be employed in the preparation of the dendritic polymers of this invention. The one-pot method tends to produce imperfect dendritic molecules having a relatively high polydispersity as compared to the nearly perfect dendrimers having a polydispersity near unity which can be prepared using the protect-deprotect method or excess reagent method. The resulting disulfide-functionalized dendritic polymers of this invention include generally any of the known dendritic architectures including, dendrimers, controlled hyperbranched polymers, dendrigrafts, and random hyperbranched polymers.

The preparation of dendrimers, random hyperbranched polymers, controlled hyperbranched polymers and dendrigrafts is well-known. Methods of synthesizing dendrimers are set forth in U.S. Pat. Nos. 4,507,466; 4,558,120; 4,568,737; 4,587,329; 4,631,337; 4,694,064; 4,713,975; 4,737,550; 4,871,779 and 4,857,599. Examples of hyperbranched polymers and methods of preparing the same are set forth, for example in U.S. Pat. No. 5,418,301. The dendritic polymers of this invention are characterized by a relatively high degree of branching, which is defined as the number average fraction of branching groups per molecule, i.e., the ratio of terminal groups plus branch monomer units to the total number of terminal groups, branch monomer units and linear monomer units. For ideal dendrons and dendrimers, the degree of branching is one. For linear polymers, the degree of branching is zero. Hyperbranched polymers have a degree of branching which is intermediate that of linear polymers and ideal dendrimers. A degree of branching of at least about 0.5 is preferred. The dendritic polymers of this invention may also include macromolecules commonly referred to as cascade molecules, arborols, arborescent grafted molecules, and the like. Also included within the scope of this invention are bridged dendritic polymers, i.e., dendritic macromolecules linked together either through surface functional groups or through a linking molecule connecting surface functional groups together, and dendritic polymer aggregates. The dendritic polymers of this invention can be generationally monodisperse or generationally polydisperse. Dendritic polymers in a monodisperse solution are substantially all of the same generation, and hence of uniform size and shape. The dendritic polymers in the polydisperse solution comprise a distribution of different generation polymers.

DISULFIDE CORE DENDRITIC POLYMERS

The dendritic polymers having a core containing a disulfide group will be illustrated in further detail with respect to the synthesis of polyamidoamine (PAMAM) dendrimers having a cystamine core using the excess reactant method for divergent dendritic synthesis. However, it should be understood that the principles of this invention are broadly applicable to generally all dendritic polymer types and synthesis techniques. The applicability of these principles will become readily apparent to those skilled in the art upon review of this disclosure.

In the case of PAMAM dendrimers prepared by the excess reactant method using divergent dendritic synthesis techniques, a core molecule having a disulfide moiety and a plurality of reactive terminal amino groups is reacted with an excess of methyl acrylate via a Michael addition reaction between the terminal amino groups on the core and the double bond on the methyl acrylate molecules to form a –0.5 generation PAMAM dendrimer having a plurality of carbomethoxy ester terminal groups. The zero generation and each successive half-generation is prepared in the usual manner by alternately separating the half-generation dendrimers from unreacted methyl acrylate and reacting the carboxy ester terminals with excess ethylene diamine to form the full-generation amino terminated dendrimers, and separating the full-generation dendrimers from unreacted ethylene diamine and reacting them again with excess methyl acrylate. Any desired generation of amino terminated, and any desired half-generation of carbomethoxy ester terminated PAMAM dendrimers having a core with a disulfide linkage can be obtained in this manner.

The disulfide moiety-containing core molecule includes at least one amino group on each side of the disulfide moiety, and is preferably, but not necessarily, symmetrical with respect to the disulfide bond. Preferred core molecules for forming PAMAM type dendritic polymers having a disulfide bond at the core include diamines, with cystamine being presently preferred.

The concepts of the present invention can be extended to other types of dendritic polymers having a disulfide-containing core by using different types of core reagents having a disulfide moiety but different reactive terminals or by modifying the amino terminals on the disulfide-groupcontaining polyamine compounds. For example, cystamine can be reacted under appropriate conditions with acrylonitrile to form a molecule having four cyano terminal groups. The cyano-terminated molecule can then be hydrogenated to form a compound having four amino terminal groups. The above reactions can be repeated as desired to form half-generation poly (propyleneimine) dendrimers having cyano terminals or full-generation poly (propyleneimine) dendrimers having amino terminals. Various other classes of dendritic polymers can be prepared with a disulfide-containing core, using divergent or convergent synthesis schemes. Examples of dendritic polymers which can be prepared with a core containing a disulfide bond include polyether dendrons, dendrimers and hyperbranch polymers, polyester dendrons, dendrimers and hyperbranch polymers, polythioether dendrons, dendrimers and hyperbranch polymers, and polyarylalkylene dendritic polymers.

The dendritic polymers having a disulfide moiety-containing core can be subjected to any of various well-known surface modification techniques to provide dendritic molecules having a single disulfide bond at the core which is reducible to split the molecule at the disulfide linkage to form two dendritic molecules having a single sulfhydryl functional group and a plurality of surface groups, which may be reactive or unreactive, as desired, and either hydrophilic or hydrophobic, as desired, etc.

The dendritic polymers having a single disulfide bond at the core can be subjected to a relatively mild reducing agent such as dithiothreitol to split the polymer into two parts and generate a reactive sulfhydryl group on each part to form dendritic polymer molecules having a single sulfhydryl group which can be used as a distinct reactive point to which other molecules can be selectively attached, and a plurality of surface groups (such as amines) which can be used for purposes of signal amplification, attachment to surfaces, analyte interaction, further conjugation, etc. The single reactive functional group allows the design of well defined homogeneous conjugates which are unencumbered by the typical statistical distribution of different degrees of substitution found in conjugates prepared via the surface groups of dendrimer molecules. An advantage lies in the fact that a unique discrete conjugate is formed which has a narrow molecular weight distribution and, therefore, is not complicated by the potential of different bioreactivites. The homogenous conjugates of this invention are generally comprised of a dendritic polymer having a sulfhydryl group and a carried material conjugated to the dendritic polymer at the sulfhydryl group. Preferred carrier materials are generally bioactive agents. Examples of biactive agents which can be conjugated to a sulfhydryl group of a dendritic polymer include pharmaceutical agents, drugs, pharmaceutical intermediaries, radioprotective agents, toxins, antibodies, antibody fragments, hormones, biological responses modifiers, scavenging agents, imuno-potentiating agents, genetic materials, antigens, polypeptides, and combinations thereof.

The dendritic polymers having a single disulfide group can be combined with different dendritic polymers also having a single disulfide group, reduced to form two different types of dendritic molecules, each of which has a single reactive sulfhydryl group, and reoxidized under aerobic conditions to form a mixture containing each of the original dendritic polymers and a differentiated dendritic polymer comprised of a part of each of the two original dendritic polymers. The dendritic polymers used to prepare the differentiated dendrimers can have different functional groups to produce differentiated dendrimers having a first type of functional group which is isolated to a first sector or surface area of the polymer, and a second type of functional group which is isolated to a second sector or surface area of the polymer. Such differentiated dendritic polymers can be used to prepare well defined complex conjugates wherein the first type of functional group on the differentiated dendritic polymer is used to selectively bind with a first type of molecule and a second type of functional group on the differentiated dendritic polymer which is used to selectively bind with a second, different type of molecule.

The dendritic polymers of this invention can be used in the preparation of a thin film coated substrate including a substrate which has been modified by application of ions or ionizable compounds of the same charge over the surface of the substrate, and one or more layers of organic materials which in each layer contains ions of the same charge, the ions of the layer immediately adjacent the substrate having the opposite charge of the modified substrate, and in the case of further layers, each further layer having a charge opposite that of the previous layer. The general technique is disclosed in U.S. Pat. No. 5,208,111, which is incorporated by reference herein. The thin films of this invention incorporate at least one layer of a dendritic polymer. For example, a cystamine core dendrimer, with amino-terminal groups, can be incorporated into such a film. By incorporating a cystamine core dendrimer layer into the film, it is possible to cleave the film at a precise location or thickness of the film by reducing the cystamine linkages with a mild reducing agent such as dithiothreitol. The sulfhydryl groups which are formed can then be reacted with targeting moieties, such as antibodies, enzymes or other proteins to create a unique sensing element.

The disulfide-core-containing dendritic polymers of this invention can be used in the preparation of a self-assembled monolayer on a quartz crystal resonator to allow for the sensitive detection of mass buildup on the surface of the electrode. The disulfide linkage of the dendritic polymer can react with a gold surface of the electrode to form a self-assembled monolayer. These dendrimer-modified electrodes can be used to detect a variety of small molecules (for example, copper ions) or even larger biomolecules.

DISULFIDE BRANCH DENDRITIC POLYMERS

Another aspect of this invention involves the preparation of dendritic polymers having branch groups, includes terminal groups, which include a disulfide moiety which is essentially inert under non-reducing conditions, but which can be subjected to a reducing agent to form a dendritic polymer having sulfhydryl terminal groups. For example, an ethylene diamine core PAMAM dendrimer having methoxy carbonyl terminals (e.g., a generation 1.5 ethylene diamine core PAMAM dendrimer) can be reacted with excess cystamine in a solvent such as methanol to form an ethylene diamine PAMAM dendrimer having cystamine terminal groups. The cystamine-terminated dendrimer can be subjected to a reducing agent such as dithiothreitol to yield a sulfhydryl terminated dendrimer. Upon removal of the reducing agent under aerobic conditions, a cross-linked species is formed by reaction of the sulfhydryl groups of different dendritic molecules. As another example, a cystamine-terminated dendrimer, such as that described above, can be reacted with methyl acrylate under appropriate conditions to form a PAMAM dendrimer having branch groups containing a disulfide moiety. The resulting methoxy carbonyl terminated dendrimer can be separated from any unreacted methyl acrylate and reacted with ethylene diamine to form an amine terminated PAMAM dendrimer having branch groups with a disulfide moiety. Any of the above steps can be repeated as desired to form dendritic polymers having one or more internal disulfide branch cell layers at any selected generation or radius from the core. Another approach to the synthesis of a dendrimer which contains sulfhydryl terminal groups is to react an amine-terminated dendrimer with iminothiolane (Traut's reagent). If this thio modified dendrimer is kept under reducing conditions, it maintains its solubility as shown by the clear, homogeneous solution that results. When oxygen is introduced to the solution, a gel forms, presumably due to the formation of disulfide bonds between the dendrimer molecules. This gel formation is reversible with the addition of an appropriate reducing agent. Such dendritic polymers are expected to have utility in biological sensing devices, as binding reagents for diagnostics, and in sophisticated drug delivery systems.

EXAMPLES

A better understanding of this invention can be had by reference to the following illustrative, non-limiting examples.

Synthesis of Cystamine Core Pamam Dendrimers
Synthesis of G=−0.5 Cystamine Branch Cell Reagent Cystamine dihydrochloride (10 grams; 0.044 mols) and methyl acrylate (69 grams; 0.80 mols) were mixed together in about 80 grams of methanol. To this stirring suspension was added dropwise triethylamine (10 grams, 0.10 mols). After the addition of about ¼–½ of the triethylamine, the cloudy, white suspension became clear. The reaction was allowed to stir at room temperature under a nitrogen blanket for 48 hours. The reaction was then heated to 40° C. for 30 minutes. The mixture was rotoevaporated under vacuum to remove excess methyl acrylate and methanol. The residue remaining after removal of solvent and excess reagent was a viscous liquid and a white precipitate. This residue was dissolved in diethyl ether and extracted with water twice. The combined water layers were back extracted with diethyl ether. The combined ether extracts were dried over magnesium sulfate and the diethyl ether was removed. The pale yellow liquid was rotoevaporated several more times with methanol. The product weighed 20 grams for a 91% yield. IR (KBR, neat) 3450 (w), 2950 (s), 2830 (s), 1725 (s), 1450 (s), 1120 (s), 1050 (s), 1000 (s), 850 (m), $^{13}$C NMR (CDCl$_3$, 360 MHz) δ 32.5, 36.3, 49.1, 51.3, 53.1, 172.6.

Synthesis of G=0 Cystamine Core

Ethylenediamine (240 grams; 4 mols) was mixed with 60 grams of methanol and cooled to 5° C. To this cooled EDA solution was added a 50% (w/w) methanol solution of G=−0.5 cystamine branch cell reagent (20 grams; 0.040 mols). The reaction was allowed to proceed under a nitrogen atmosphere at 5° C. for 5 days. The reaction was then heated to 40° C. for 30 minutes. Some of the excess ethylenediamine and methanol was removed by rotary evaporation under vacuum. The remaining excess ethylenediamine was removed by azeotroping using 3/1 toluene/methanol. The purified product weighed 30 grams which, after assuming some trapped methanol, indicates an essentially 100% yield. IR (KBr, neat) 3280 (s), 3075 (m), 2940 (m), 2850 (m), 1650 (s), 1550 (s), 1120 (w). $^{13}$C NMR (CDCl$_3$, 360 MHz) δ 33.3, 33.5, 35.9, 41.0, 41.4, 41.9, 49.2, 49.6, 52.2, 172.6.

Synthesis of G=0.5 Cystamine Core

To a 50 weight percent methanol solution of methyl acrylate (19 grams; 0.2 mols) was added with stirring over a 30 minute period G=0, cystamine core (15 grams; 0.025 mols). This reaction was allowed to stir at room temperature under a nitrogen atmosphere for 48 hours. The reaction was then heated to 40° C. for 30 minutes. Several rotary evaporations under vacuum were done to remove methanol and excess methyl acrylate. The product weighed 33 grams and after taking into account trapped methanol this represents about a 95% yield. IR (KBr, neat) 3320 (m), 2950 (m), 2830 (m), 1740 (s), 1660 (s), 1530 (s), 1450 (s), 1050 (m), $^{13}$C NMR (CDCl$_3$, 360 MHz) δ 32.1, 33.2, 35.7, 36.8, 48.9, 49.2, 51.2, 52.2, 52.5, 171.9, 172.7.

Synthesis of G=1 Cystamine Core

Ethylenediamine (421 grams; 7 mols) was mixed with 106 grams of methanol and cooled to 5° C. To this cooled EDA solution was added a 50% (w/w) methanol solution of G=0.5 cystamine core (25 grams; 0.019 mols). The reaction was allowed to proceed under a nitrogen atmosphere at 5° C. for 5 days. The reaction was then heated to 40° C. for 30 minutes. Some of the excess ethylenediamine and methanol was removed by rotary evaporation under vacuum. The remaining excess ethylenediamine was removed by azeotroping using 3/1 toluene/methanol. The purified product weighed 38 grams which, after assuming some trapped solvent, represents a 100% yield. IR (KBr, neat) 3275 (m), 3060 (m), 2925 (m), 2850 (m), 1650 (s), 1550 (s). $^{13}$C NMR (CDCl$_3$, 360 MHz) δ 33.4, 33.9, 35.7, 37.5, 41.1, 41.9, 49.4, 50.1, 52.2, 52.4, 172.5, 173.1.

Synthesis of G=1.5 Cystamine Core

To a 50 weight percent methanol solution of methyl acrylate (20 grams; 0.21 mols) was added with stirring over a 30 minute period G=1 cystamine core (20 grams; 0.013 mols). This reaction was allowed to stir at room temperature under a nitrogen atmosphere for 48 hours. The reaction was then heated to 40° C. for 30 minutes. Several rotary evaporations under vacuum were done to remove any excess methyl acrylate and methanol. The purified product weighed 39.5 grams which, after assuming some trapped solvent, represents about a 95% yield. IR (KBr, neat) 3300 (m), 3075 (w), 2950 (m), 2825 (m), 1740 (s), 1650 (s), 1540 (s), 1450 (s), 1050 (m). $^{13}$C NMR (CDCl$_3$, 360 MHz) δ 32.3, 33.1, 33.4, 35.4, 36.9, 37.2, 48.9, 49.2, 49.5, 51.3, 52.1, 52.5, 172.3, 172.4, 172.8.

Synthesis of G=2 Cystamine Core

Ethylenediamine (727 grams; 12.1 mols) was mixed with 182 grams of methanol and cooled to 5° C. To this cooled EDA solution was added a 50% (w/w) methanol solution of G=1.5 cystamine core (25 grams; 0.0086 mols). The reaction was allowed to proceed under a nitrogen atmosphere at 5° C. for 5 days. The reaction was then heated to 40° C. for 30 minutes. Some of the excess ethylenediamine and methanol was removed by rotary evaporation under vacuum. The remaining excess ethylenediamine was removed by azeotroping using 3/1 toluene/methanol. The purified product weighed 40 grams which after assuming some trapped solvent, represents a 100% yield. IR (KBr, neat) 3275 (s), 3070 (m), 2950 (m), 2850 (m), 1650 (s), 1550 (s), 1460 (m), 1440 (m), 1030 (w). $^{13}$C NMR (CDCl$_3$, 360 MHz) δ 33.1, 33.4, 33.6, 35.4, 37.2, 40.9, 41.6, 49.2, 49.6, 49.8, 51.9, 52.2, 172.6, 173.0.

Synthesis of G=2.5 Cystamine Core p To a 50 weight percent methanol solution of methyl acrylate (18.2 grams; 0.2 mols) was added with stirring over a 30 minute period G=2 cystamine core (20 grams; 0.006 mols). This reaction was allowed to stir at room temperature under a nitrogen atmosphere for 4 days. The reaction was then heated to 40° C. for 30 minutes. Several rotary evaporations under vacuum were done to remove any excess methyl acrylate and methanol. The purified product weighed 33.6 grams for about a 90% yield. IR (KBr, neat) 3290 (m, br), 3080 (w), 2950 (m), 2830 (m), 1740 (s), 1650 (s), 1550 (s), 1450 (s), 1050 (m), 850 (w). $^{13}$C NMR (CDCl$_3$, 360 MHz) δ 32.3, 33.0, 33.3, 35.3, 36.9, 37.2, 48.9, 49.1, 49.4, 49.7, 51.3, 52.0, 52.1, 52.4, 172.3, 172.8.

Synthesis of G=3 Cystamine Core

Ethylenediamine (1353 grams; 22.5 mols) was mixed with 427 grams of methanol and cooled to 5° C. To this cooled EDA solution was added a 50% (w/w) methanol solution of G=2.5 cystamine core (25 grams; 0.004 mols). The reaction was allowed to proceed under a nitrogen blanket at 5° C. for 6 days. The reaction was then heated to 40° C. for 30 minutes. Some of the excess ethylenediamine was removed by rotary evaporation under vacuum. The remaining excess ethylenediamine was removed by ultrafiltration on a 3000 MWCO spiral membrane. All traces of water were removed by lyophilization. The purified, dried product weighed 22.8 grams for an 82% yield. IR (KBr, neat) cm$^{-1}$: 3300 (s); 3075 (m); 2940 (s); 2850 (m); 1650 (s); 1550 (s); 1475 (m); 1310 (m); 1025 (m); 700 (w).

Synthesis of G=3.5 Cystamine Core

To a 50 weight percent methanol solution of methyl acrylate (11 grams; 0.12 mols) was added dropwise, with stirring, over a 30 minute period, a 50≧75 weight percent methanol solution of G=3 cystamine core (12 grams; 0.0017 mols). This reaction was stirred under a nitrogen atmosphere at room temperature for 4 days. The reaction was then heated to 40° C. for 30 minutes. Several rotary evaporations under vacuum were done to remove any excess methyl acrylate and methanol. The purified product weighed approximately 21 grams 10 (assuming 15% trapped methanol) for a 98% yield. IR (KBr, neat) cm$^{-1}$: 3300 (m,br); 2950 (s); 1750 (s); 1650 (s); 1560 (s); 1400 (m); 1325 (m); 1125 (s); 1040 (s).

Synthesis of G=4 Cystamine Core

Ethylenediamine (1563 grams; 26 mols) was mixed with 467 grams of methanol and cooled to 5° C. To this cooled EDA/methanol solution was added a 50% (w/w) methanol solution of G=3.5 cystamine core (15 grams; 0.0012 mols). The reaction was allowed to proceed under nitrogen at 5° C. for 6 days. The reaction was then heated to 40° C. for 30 minutes. Some of the excess ethylenediamine was removed by rotary evaporation under vacuum. The remaining excess EDA was removed by ultrafiltration using a 3000 MWCO membrane. All traces of water were removed by lyophilization. The purified product weighed 15.3 grams for a 90% yield. IR (KBr, neat) cm$^{-1}$: 3280 (m); 3075 (m); 2940 (m); 2840 (m); 1650 (s); 1550 (s); 1475 (m); 1440 (m); 1150 (w); 1050 (w).

Synthesis of G=4.5 Cystamine Core

To a 50 weight percent methanol solution of methyl acrylate (4.3 grams; 0.045 mols) was added dropwise with stirring over a 30 minute time period a 50% (w/w) methanol solution of G=4 cystamine core (5 grams; 0.00035 mols). This reaction was allowed to stir at room temperature under a nitrogen atmosphere for 4 days. The reaction was then heated to 40° C. for 30 minutes. Several rotary evaporations were done to remove any excess methyl acrylate and methanol. The purified product weighed about 9 grams (assuming 20% trapped methanol) for essentially a 100% yield. IR (KBr, neat) cm$^{-1}$: 3300 (m); 3060 (w); 2950 (m); 30 2840 (m); 1740 (s); 1650 (s); 1540 (s); 1450 (m); 1360 (m); 1200 (s); 1050 (m); 840 (w Synthesis of G=5 Cystamine Core Ethylenediamine (1460 grams; 24.3 mols) was mixed with 365 grams of methanol and cooled to 5° C. To this cooled EDA/methanol solution was added a 50% (w/w) methanol solution of G=4.5 cystamine core (7 grams; 0.00028 mols). The reaction was allowed to proceed under a nitrogen blanket at 5° C. for 8 days. The reaction was then heated to 40° C. for 30 minutes. Some of the excess ethylenediamine was removed by rotary evaporation under vacuum. The remaining excess ethylenediamine was removed by ultrafiltration on a 10,000 MWCO membrane. All traces of water were removed by lyophilization. The purified dried product weighed 6.2 grams for a 77% yield. IR (KBr, neat) cm$^{-1}$: 3260 (m); 3050 (w); 2920 (w); 2825 (w); 1650 (s); 1550 (s); 1460 (w); 1450 (w); 1150 (w); 1030 (w).

Synthesis of G=5.5 Cystamine Core

To a 50 weight percent methanol solution of methyl acrylate (2.6 grams; 0.027 mols) was added dropwise with stirring over a 30 minute time period a 50% (w/w) methanol solution for G=5 cystamine core (3 grams; 0.0001 mols). This reaction was allowed to stir at room temperature under a nitrogen atmosphere for 5 days. The reaction was then heated to 40° C. for 30 minutes. Several rotary evaporations were done to remove any excess methyl acrylate and methanol. The purified product weighed 10.2 grams and contained about 50% methanol for a product weight of 5.1 grams and a 96% yield. IR (KBr, neat) cm$^{-1}$: 3300 (m); 3075 (w); 2950 (m); 2830 (m); 1740 (s); 1650 (s); 1550 (s); 1440 (s); 1350 (m); 1260 (s); 1200 (s); 1050 (m); 860 (w).

Synthesis of G=6 Cystamine Core

A methanol solution (29% by weight of methanol) of ethylenediamine (2921 grams; 34.5 mols) was cooled to 5° C. To this cooled EDA/methanol solution was added a 50% (w/w) methanol solution of G=5.5 cystamine core (5 grams; 0.0001 mols). The reaction was allowed to proceed under a nitrogen blanket at 5° C. for 9 days. The reaction was then heated to 40° C. for 30 minutes. Some of the excess ethylenediamine was removed by rotary evaporation under vacuum. The remaining excess EDA was removed by ultrafiltration on a 10,000 MWCO membrane. All traces of water were removed by lyophilization. The purified, dried product weighed 5.2 grams for a 90% yield. IR (KBr, neat) cm$^{-1}$: 3275 (m); 3075 (w); 2940 (w); 2825 (w); 1650 (s); 1550 (s); 1475 (w); 1340 (w); 1175 (w); 1050 (w).

Synthesis of G=6.5 Cystamine Core

To a methanol solution (at least 50 weight % methanol) of methyl acrylate (2.65 grams; 0.028 mols) was added dropwise with stirring over a 30 minute time period G=6 cystamine core (3.2 grams; 0.000055 mols) diluted to at least 50% (w/w) with methanol. This reaction was allowed to stir at room temperature under a nitrogen atmosphere for 5 days. The reaction was then heated to 40° C. for 30 minutes. Several rotary evaporations were done to remove any excess methyl acrylate and methanol. The purified product weighed 8.7 grams and assuming trapped methanol the yield is probably over 90%. IR (KBr, neat) cm$^{-1}$: 3300 (m); 3100 (w); 3000 (m); 2875 (m); 1750 (s); 1650 (s); 1550 (s); 1450 (m); 1375 (m); 1220 (s); 1075 (w); 875 (w).

Synthesis of G=7 Cystamine Core

A methanol solution (27 weight % methanol) of ethylenediamine (4141 grams; 69 mols) was cooled to 5° C. To this cooled solution was added G=6.5 cystamine core (5 grams; 0.00005 mols) that was at least 75 weight percent methanol. This reaction was allowed to proceed under a nitrogen blanket at 5° C. for 10 days. The reaction was then heated to 40° C. for 30 minutes. Some of the excess ethylenediamine was removed by rotary evaporation under vacuum. The remaining excess EDA was removed by ultrafiltration using a 10,000 MWCO membrane. All traces of water were removed by lyophilization. The purified, dried product weighed 5.1 grams for an 88% yield. IR (KBr, neat) cm$^{-1}$: 3275 (s); 3075 (m); 2950 (m); 2850 (m); 1650 (s); 1550 (s); 1475 (m); 1350 (m); 1160 (w); 1050 (w).

Synthesis of G=7.5 Cystamine Core

To a methanol solution (at least 50 weight percent methanol) of methyl acrylate (3.0 grams; 0.031 mols) was added dropwise with stirring over a 30 minute period, G=7 cystamine core (3.5 grams; 0.00003 mols) diluted to at least 50 weight percent methanol. This reaction was allowed to stir at room temperature for 7 days. The reaction was then heated to 40° C. for 30 minutes. Several rotary evaporations under vacuum were done to remove any excess methyl acrylate and methanol. The purified product weighed 10.4 grams. Assuming some trapped methanol, the yield is probably over 90%. IR (KBr, neat) cm$^{-1}$: 3300 (s); 3075 (m); 2950 (s); 2830 (s); 1740 (s); 1650 (s); 1550 (s); 1450 (s); 1350 (m); 1200 (s); 1050 (m); 840 (w).

BIOCONJUGATION USING CYSTAMINE CORE PAMAM DENDRIMERS

Experiments

A. TE SPA-C1-PAMAM-oligonucleotide Conjugation

Preparation of dendrimer moiety. A 375 ug quantity (250 nmol) of generation one cystamine-core PAMAM Cl was treated with 1.5 mg (4.0 umol) of the organotin reagent TESPA-NHS (triethyltinpropionic-N-hydroxysuccinimide, provided by Atom Sciences, Inc.) in 300 uL methanol with 1 uL TEA for two hours at room temperature. The reaction was quenched with 1 uL of n-propylamine. The octasubstituted derivative was purified on the lipophilic Sephadex resin of LH-20 (0.5 cm×46 cm) with methanol as the eluent. Detection was performed at 230 nm via an ISCO V-4 detector. The first peak off of the column (the modified PAMAM) was collected, dried under nitrogen and reconstituted with 340 uL of 25 mM DTT. One uL of TEA was added and the reaction was incubated for 30 minutes at room temperature. The reaction mixture was then passed over an LH-20 column (vida supra) and the first peak was collected. This first peak was the reduced form of the dendrimer as evidenced by a colorimetric response from Ellman's reagent. The second peak off of the column yielded a negative response to Ellman's reagent and is excess TESPA-NHS which was not completely removed from the first pass over the column. The third peak is the large excess of dithiothreitol. This peak gave a positive response to Ellman's reagent. Note: Unmodified cystamine-core PAMAM with amino groups on the surface appeared to adsorb to the LH-20 resin when methanol was used as the eluent. Apparently, these chromatographic conditions require a hydrophobic surface on the dendrimer for efficient elution of the compound.

Preparation of oligonucleotide moiety. A 10 nmol quantity of a 17-mer oligonucleotide with a hexamethylene amine group on the 5'-end (synthesized at Midland Certified Reagent Company for Atom Sciences, Inc.) in 15.4 µL of water was placed in 15.4 µL of 50 mM borate buffer of pH 8.5. The oligonucleotide was treated with 0.6 mg sulfo-SIAB (Pierce Chemical Co.) in 200 µL of the same buffer. The reaction was incubated for two hors at room temperature in the dark and was then passed over a PD-10 Column with water as the eluent which was monitored at 260 nm. The first peak was collected, concentrated down to ca. 200 µL on a Centricon 10 (Amicon) unit and passed over the PD-10 column again. The SIAB-oligonucleotide was characterized by capillary gel electrophoresis (CGE). The migration time of the modified oligonucleotide was different than unmodified oligonucleotide as confirmed by coinjection experiments. All CGE experiments were preformed on a Beckman P/ACE 2050 equipped with System Gold™ software. Polyacrylamide gel-filled capillaries (5%T, 5%C, cat. no 193-5211) were obtained from J & W Scientific. J & W tris-borate-urea buffer (cat. no. 590-4001) was used in CE Experiments. Separations were performed in a 47 cm capillary with an injection to detector (UV detection at 254 nm) distance of 40 cm. Voltage was held constant at 300 V/cm.

Macromolecular conjugation. The reduced dendrimer in methanol (volume ca. 5 mL) was combined with the ca. 2 mL of the DNA-SIAB in water. The mixture was then taken to dryness on a rotoevaporator (30° C., ca. 1 in. Hg) and wasthen reconstituted with 750 µL methanol, 250 µL water, and 0.5 µL of triethanolamine (TEA). The pH of this reaction mixture was ca. 8. The reaction incubated at room temperature overnight in the dark. The crude reaction mixture was characterized by CGE; a new peak (the presumed conjugate) was observed in the electropherogram which had a different migration time than that of the oligonucleotide of the SIAB-modified oligonucleotide. The oligonucleotide peaks appear around 16 minutes when analyzed under the conditions described above whereas the presumed conjugate peak appears at ca. 19 minutes.

B. DOTA-C1-PAMAM-oligonucleotide Conjugation

Preparation of PA-DOTA modified cystamine-core (C1) PAMAM dendrimer. Cystamine-core PAMAM dendrimer (150 µL of stock solution, 1.5 mg or 1.0 µmol) was dissolved in 300 µL of a carbonate buffer (50 mM), containing 12.6 mg (or 21 µmol) of SCN-PA-DOTA (where SCN-PA-DOTA is an isothiocyanato derivative of α-[2-(4-aminophenyl)ethyl]-1,4,7,10-tetraazacyclododecane-1,4,7,10-tetraacetic acid). The mixture was adjusted to pH 9.5 with 2 N NaOH (~15 µL). Incubation was continued overnight at 37° C. Upon termination, the product was purified on a DEAE cellulose column (1.2×16 cm) which was prewashed with 25 mL of 1.0 M NaCl in tris buffer (20 mM, pH7), and then equilibrated with tris buffer. The eluent was a NaCl step gradient in this tris buffer. The PA-DOTA-modified C1 PAMAM dendrimer eluted in the 0.3 M NaCl fraction in approximately eight mL. The product was characterized by UV spectroscopy and exhibited a λ max at ca. 250 nm. The product stayed close to the origin when analyzed by TLC on silica with a 4:4:1 methanol: chloroform: ammonium hydroxide solvent system.

Reduction of PA-DOTA-modified C1 PAMAM dendrimer. The modified dendrimer (2.0 mL, ca. 200 nmol) was concentrated on a rotoevaporator to a volume of ca. 200 µL. This material was desalted on a PD-10 column and then evaporated to dryness and then reconstituted with 200 µL of carbonate buffer. The solution was adjusted to pH 8 with sodium bicarbonate (1.0M). A 200 µL aliquot of 50 mM DTT/5 mM EDTA in carbonate buffer (50 mM pH8) was added to the modified dendrimer. The reduction was conducted at 37° C. for 30 min., and the reduced material was purified by gel filtration on a PD-10 column. Approximately 3 mL of the eluent was collected, which was for the conjugation below. To determine the sulfhydryl concentration, 200 µl of the reduced dendrimer was mixed with 10 µL of 10 mM DTNB followed by 290 µL of carbonate buffer at pH 8.5. After 10–15 minutes, OD 412 was measured, and the sulfhydryl concentration was calculated based on a standard curve, using cysteamine hydrochloride as the calibrant.

Conjugation of SIAB-oligonucleotide with the reduced PA-DOTA modified C1 dendrimer. The reduced PA-DOTA-modified dendrimer prepared as described above was evaporated to near dryness at 30° C. under reduced pressure. The SIAB-oligonucleotidem freshly prepared and purified, was added to the concentrate reduced dendrimer. Sodium bicarbonate (ca. 15 µL of a 1.0 M solution) was added to bring the pH to 8–9. The reaction mixture was then evaporated to near dryness and reconstituted with a minimal amount of water (50 μL). The pH of this solution was ca. 9. The reaction was allowed to continue in the dark overnight at 21° C. The reaction mixture was then passed over a PD-10 column and the appropriate column fractions were concentrated on Centricon 10 units and washed with five 2 mL washes of water to remove unconjugated dendrimer. The final retentate contained the presumed conjugate and had an OD 260 of 2.9 with a λ max at 255 nm. The DOTA-C1-PAMAM-oligonucleotide conjugate was characterized by both polyacrylamide gel electrophoresis and by CGE. PAGE analysis supported formation of the conjugate as evidenced by a retarded migration distance of the presumed conjugate when compared to the unmodified oligonucleotide. Capillary electropherograms showed the presence of a presumed conjugate peak. Coninjection experiments of the conjugate with unmodified oligonucleotide and with the reduced dendrimer supported formation of the conjugate.

The dendritic polymer-oligonucleotide conjugates can be advantageously employed in DNA analysis. For example, the remaining (non-sulfhydryl) surface reactive groups on the dendritic can be used for signal amplification in various separation techniques such as electrophoreses and various chromatographic techniques.

C. Dendrimer-Dendrimer Coupling

Reduction and reoxidation of cystamine-core PAMAM dendrimers. A 2 mg/mL solution of a generation three ethanolamine-terminated PAMAM dendrimer and a 0.5 mg/mL solution of a generation one ethylenediamine-terminated PAMAM dendrimer were prepared in a pH 8.2 borate buffer. The dendrimer concentrations are ca. 280 uM. One mL of each solution was withdrawn and mixed together. The samples were treated with 10 uL of a 0.21 M DTT solution in the same buffer, and the samples were incubated overnight and then ultrafiltered over a 500 molecular weight cutoff membrane in a micropartition device. After ultrafiltration, (one mL down to ~100 uL two times) the sample was analyzed by capillary electrophoresis after one hour. At this time, some reoxidation of the mixed disulfide was seen. After shaking overnight in air, most of the mixture was reoxidized to mixed disulfides. Capillary electrophoretic analysis showed the presence of a mixed-surface PAMAM heterodisulfide dendrimer. Homodisulfides (i.e., starting materials) were also seen in the electropherogram.
Results Cystamine-core PAMAM dendrimers are useful for a single-point attachment of a dendritic PAMAM to another molecule in a conjugation scheme. The cystamine-core dendrimers are as easily synthesized as the more "conventional" ethylenediamine-core PAMAM dendrimers. Furthermore, the reduction (i.e., cleavage) of the dendrimer to yield a free sulfhydryl is relatively straightforward and can be done under mild reducing conditions. The reduced dendrimer can be purified by gel filtration or ultrafiltration to remove excess reductant. The sulfhydryl of a generation one material was found to be reactive toward Ellman's reagent and toward an iodoacetamide group on a 17 mer oligonucleotide. A reduced generation one cystamine-core PAMAM was also coupled to a reduced generation three cystamine-core PAMAM to yield a heterodisulfide in which the two hemispheres were of different sizes and also had different surface groups on each hemisphere.

The single point of attachment on the reduced cystamine-core PAMAM provides a location for site-specific coupling of molecules to PAMAM dendrimers which still exhibit multiple surface groups for further conjugation or intermolecular interactions with other species. Such conjugates are monodisperse relative to conjugations performed on the multiple surface groups of dendrimers which are polydisperse owing to different degrees of substitution. The latter can only be made monodisperse by saturating the entire surface with a tag. Saturation however may be hindered when factors such as spatial constraint are considered.

ULTRATHIN MULTILAYER DENDRIMER FILMS

Experimental:

Poly (sodium 4-styrenesulfonate) (NaPSS, MW ~70,000), poly(allylamine hydrochloride) (PAA HCl, high MW), 3-aminopropyltrimethoxysilane, 2-sulfobenzoic acid cyclic anhydride were purchased from Aldrich. 5-([4,6-Dichlorotriazin-2-yl]amino)fluorescein (DTAF) was obtained from Sigma. The construction of alternating polyelectrolyte multilayers was monitored by UV/Vis spectroscopy (Cary Model 118 Spectrophotometer). SEC measurements were performed on a series of Beckman TSK 4000 PW, 3000 PW and 2000 PW columns using HP 1081 pump, Waters 401 R1 detector and PE Nelson 900 series interface. Ultrafiltrations were performed on Amicon 3,000 and 10,000 Molecular Weight Cut Off (MWCO) membranes. The $^{13}C$ NMR spectra were obtained on a Bruker 360 MHz NMR Spectrometer using $CDCl_3$ as solvent and internal standard.

The ultrapure water was obtained from Milli Q water purification system (18 MΩcm). The toluene was distilled from $CaH_2$.

Aminopropylsilanized fused quartz, silicon wafer and Mica substrates were used for most of the experiments. Such substrates were ultrasonically activated in conc. $H_2SO_4$/$H_2O_2$ (7:3) mixture at 50° C. for 1 hour and then rinsed with Milli Q water. After being consecutively immersed for 2 minutes in pure methanol, methanol/toluene (1:1) mixture, and pure toluene, these substrates were allowed to react with 3-aminopropyltrimethoxysilane (a 5% solution in toluene) for 15 hours under $N_2$. The modified substrates were cleaned for 1 minute each in toluene, toluene/methanol (1:1) mixture methanol and then Milli Q water. The freshly amino-modified substrates were stored in water and used within 2 days.

The construction of ultrathin multilayers was accomplished by consecutive adsorption from oppositely charged polyelectrolyte solutions. The amino-modified substrates were immersed for 20 minutes in a solution containing 40 mg NaPSS dissolved in a mixture of 1 ml of 0.1 N HCl and 19 ml of Milli Q water. After rinsing with water for 3 times, the substrates were then immersed for 20 minutes in a solution containing 40 mg PAA HCl in a mixture of 1 ml of 0.1 N HCl and 19 ml of Milli Q water. By repeating the above dipping procedures, the ultrathin multilayer films were obtained. In the case of NaPSS/dendrimer ($NH_3$+) films, PAA HCl was replaced by protonated ($NH_3$+) Starburst® dendrimers, while in another case dendrimer surfaces derivatized with sulfonate groups ($SO_3$-) and the protonated dendrimer ($NH_3$+) were used to build up multilayers comprised of only dendrimers.

Quartz Glass Surface Without 3-Aminopropyltrimethoxvsilane (APTMS) Treatment.

The quartz glass was ultrasonically activated in $H_2SO_4$/$H_2O$ mixture for 1 hour, washed with 30% of NaOH solution, and then rinsed with Milli Q water 3 times. The control experiment was done without washing with the NaOH solution.

Synthesis of Dendrimer—Fluorescein (1:1) Derivatives.

After DTAF-HCl (0.24 mg) was neutralized to pH=8–9 with triethylamine, it was allowed to react with dendrimer G=7.0 ($NH_3$ core, 40 mg) in 4 ml Milli Q water solution overnight under dark condition. The crude product was extensively purified by ultrafiltration (Amicon 10,000 MWCO) until no DTAF was observed in the filtrate by TLC. The purified dendrimer—DTAF solution was adjusted to neutral and then diluted with a mixture of 1 ml of 0.1 N HCl and 19 ml of Milli Q water. The multilayer NaPSS/dendrimer-DTAF films were prepared as described above. Dendrimer-10 DTAF and dendrimer-192 DTAF derivatives were prepared in a similar manner.

Synthesis of Sulfonated Dendrimer Derivatives.

A large excess of 2-sulfobenzoic acid cyclic anhydride (324 mg)/THF solution was slowly dropwised into a dendrimer (40 mg)/water (1 ml) solution at 0° C. (about 30 min.). After THF was rotary-evaporated the product was purified by ultrafiltration (3000 MWCO) for 3 days until no filtrate spot on TLC was observed by short wave UV monitor. The purified functionalized dendrimer solution was measured by UV spectrometer.

pH Effect on Dendrimer-$NH_2$ Adsorption.

The dendrimer-$NH_2$lNaPSS multilayers were constructed on top of a PAA/NaPSS multilayer film at several different pH values (pH 7.5, 4.35, and 2.07). The dipping time in each oppositely charged solution was 5 minutes.

Molecular Size Effect on Dendrimer-$NH_2$ Adsorption.

Different generations (G1.0, G4.0, and G7.0) were utilized to construct dendrimer-$NH_2$/NaPSS multilayers under the same concentration, pH, precursor layer, and dipping time.

Reduction of Cystamine Core Dendimer within the Multilayers.

Cystamine core dendrimer (Cys-G6.0) was synthesized as reported previously. The sample purity was checked by $^{13}C$ NMR, SEC, and IR. Cys-G6.0 was adsorbed from acidic solution onto a PAAH/NaPSS multilayer precursor film using a 20 min. dipping time. Such a film was subsequently constructed with either an additional 3, 4, or 21 PAAH/NaPSS bilayers. The reduction of cys-G6.0 within the multilayers was achieved in dithiothreitol solution (40 mg/20 ml water) at pH 8 (adjusted by $NaHCO_3$) for 2 hours. The control experiment was done under the same condition without dithiothreitol.

Results and Discussion

1) Alternating NaPSS/PAA HCl multilayer films were successfully constructed on amino-modified surfaces through consecutively adsorption of oppositely charged polyelectrolytes. The UV measurements (FIG. 1) showed that the absorbance of multilayers is linearly related with the number of layers, which may suggest that the film grows uniformly during the construction. These results are in good agreement with those obtained by Decher et al.

Figure 2:
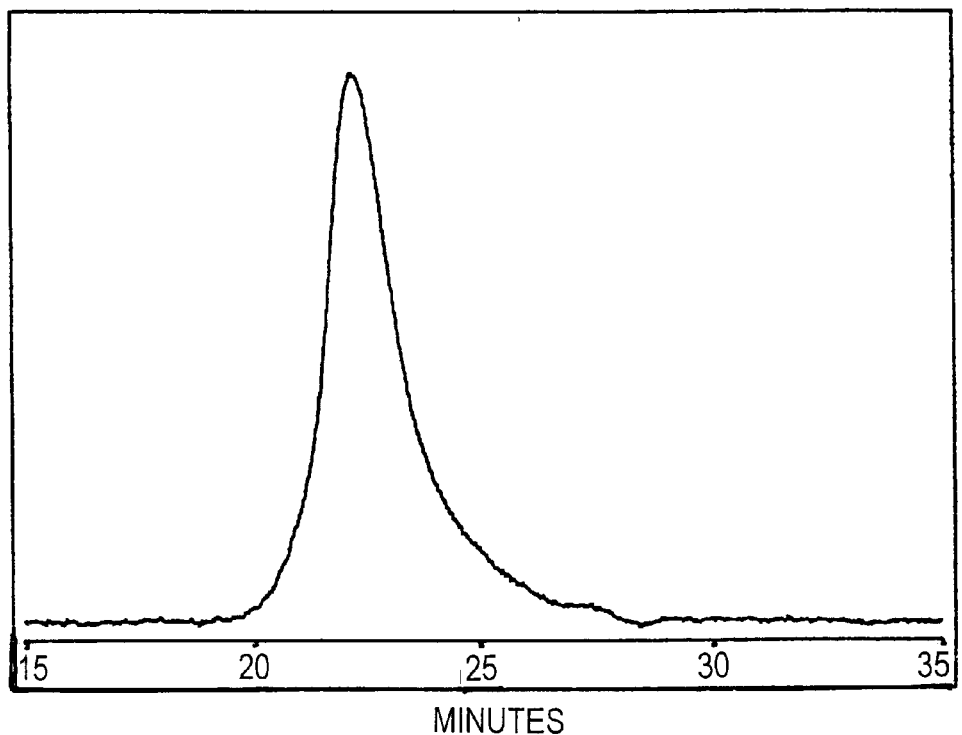
FIG. 2 is a size exclusion chromatograph of a Starburst® dendrimer sample (G=7.0, $NH_3$ core)
Figure 3:
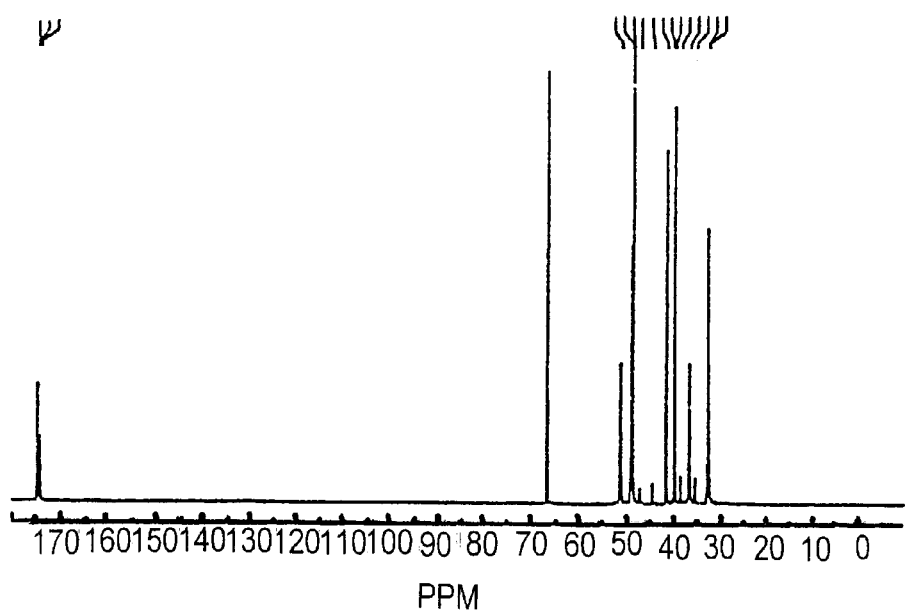
FIG. 3 is a nuclear magnetic resonance spectrum of the starburst dendrimer sample characterized by size exclusion chromatography in FIG. 2.
Figure 4:
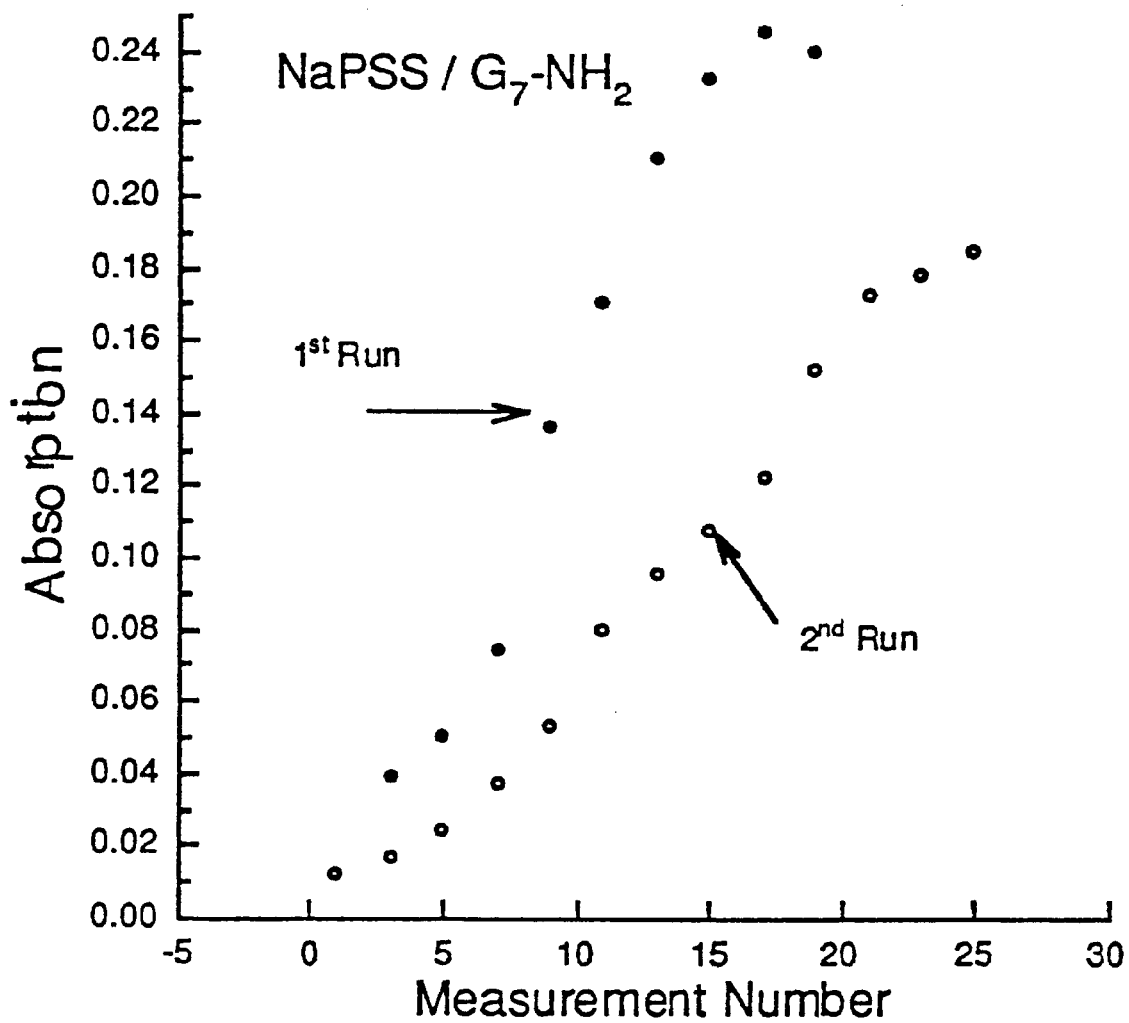
FIG. 4 is a graph of ultraviolet absorbance versus number of layers for a multilayer film of polystyrenesulfonate and a generation 7, $NH_3$ core, polyamidoamine dendrimer.

2) The Starburst® dendrimer Sample (G=7.0, $NH_3$ core) was characterized by SEC and NMR (FIGS. 2 and 3). The construction of NaPSS/G7-$NH_3$+ multilayers on amino-modified surfaces was not successful. Irreproducible results were obtained as indicated in FIG. 4. This could be due to the fact that the dendrimer is relatively rigid compared with a linear polymer. Therefore, the "rigid" dendrimer may not be able to repair the surface roughness or defects as the linear polymer does.

Figure 5:
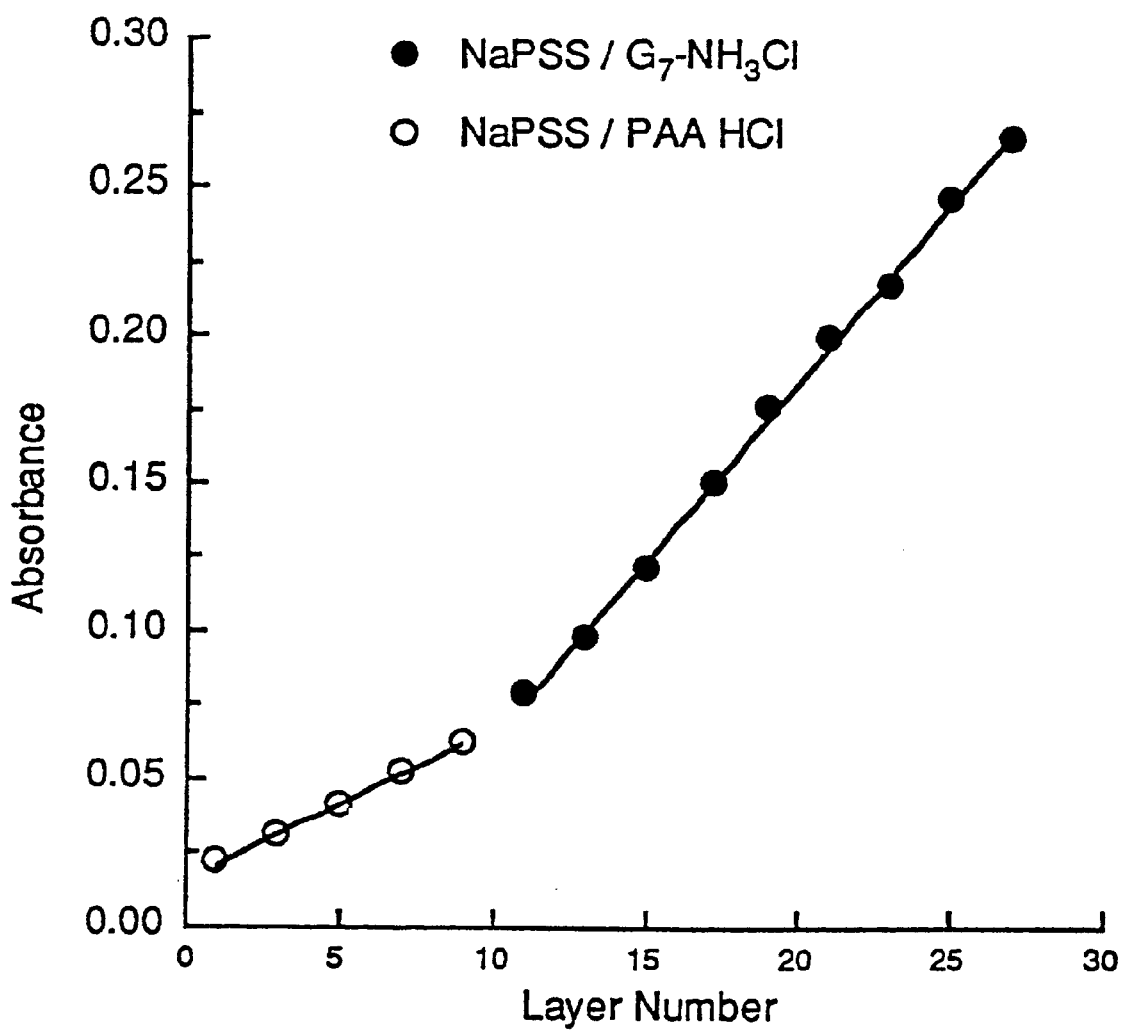
FIG. 5 is a graph of ultraviolet absorbance versus number of layers for a multilayer film comprising alternating polystyrenesulfonate and a generation 7, $NH_3$ core, polyamidoamine dendrimer on a uniform polystyrenesulfonate/poly(allylamine hydrochloride) multilayer surface.

3) Based on the above assumptions, alternating NaPSS/G7-$NH_3$+ multilayers were successfully constructed on top of a primer layer of five NaPSS/PAA HCl bilayers (FIG. 5). As expected, a good linear relationship between absorbance and number of layers was observed, indicating the formation of uniform NaPSS/G7-$NH_3$+ multilayer films. However, the slope of NaPSS/G7-$NH_3$+ films is much higher than that of the NaPSS/PAA HCl films. This difference could result from the topological effect of the dendrimers. It is known that linear polymers can be adsorbed on a surface in three confirmations: tails, trains, and loops. However, in the case of dendrimers, only tails are available and contributing for surface adsorption. Based on the root mean square radius of gyration (Rg) obtained from both experiment and calculations, one could calculate that the segmental density of a dendrimer is higher than that of a linear polymer. In addition, compared to the same molecular weight of a linear polymer, a Starburst® dendrimer exhibits all of its functional groups on the surface, while the linear polymer contains only part of its functional groups on the surface and the rest of them are buried inside the polymer. In other words, the surface density of chain ends for the dendrimer layer is higher than that of the linear polymers. Therefore, more NaPSS were adsorbed onto the dendrimer surface during each growth step and the higher UV absorbance (or slope) was obtained at pH 7.5 (FIG. 5).

Figure 6:
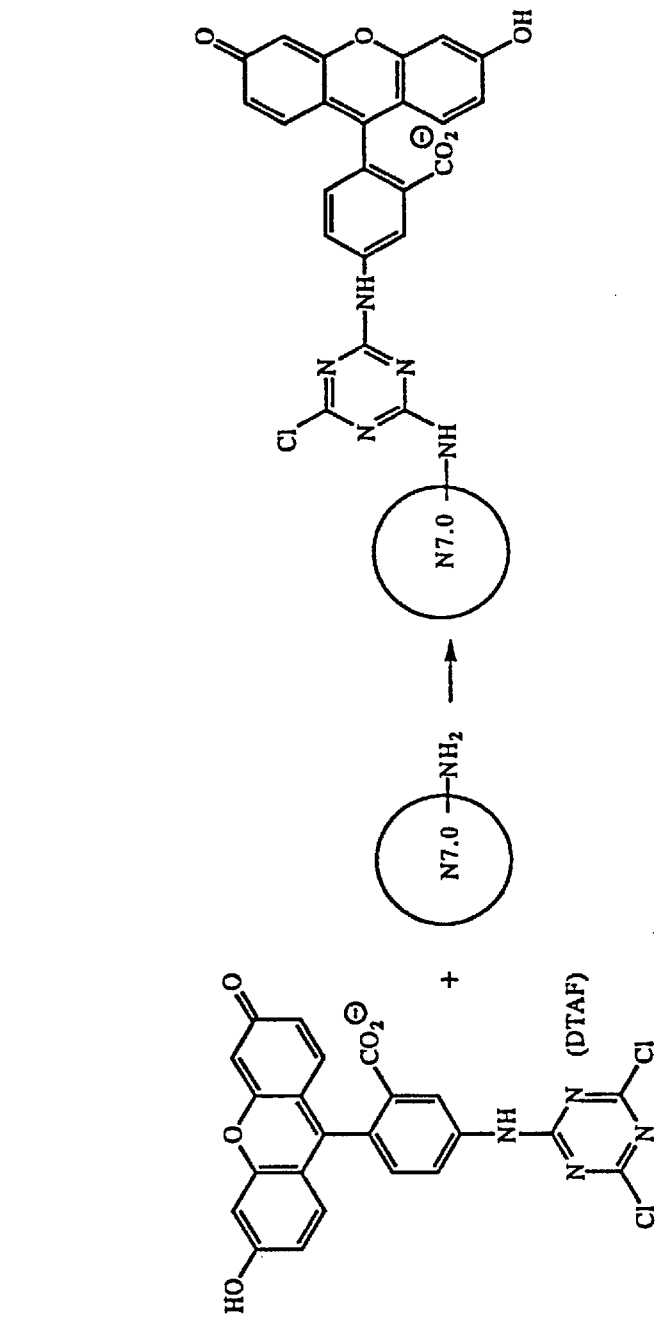
FIG. 6 is a reaction scheme showing the synthesis of a dendrimer-fluorescein derivative.

4) Functionalized dendrimers with different numbers of fluorescein probe (DTAF) on the surface were also synthesized and used for the construction of multilayer films. The synthesis is outlined in Scheme I (FIG. 6). Under the ratios of 1:1 or 1:10 (dendrimer: DTAF), the fluorescein functionalized dendrimers were conveniently prepared in basic buffers (pH=9), and subsequently purified by ultrafiltration before use. However, the dendrimer covered with 50% DTAF (dendrimer: DTAF=1:192) was not completely soluble in acidic solution due to the hydrophobicity of DTAF end groups on the dendrimer surface.

Figure 7:
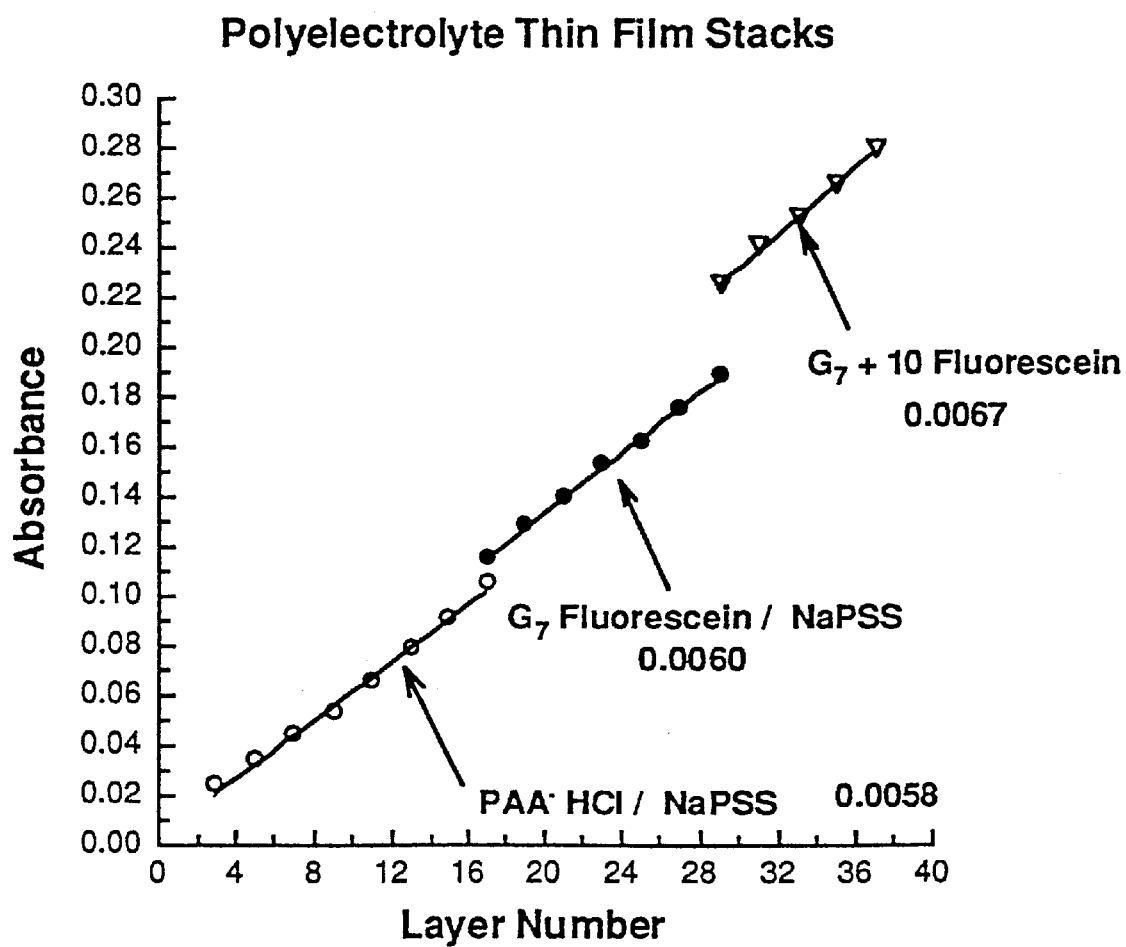
FIG. 7 is a graph of ultraviolet absorbance versus number of layers for a polystyrenesulfonate/polyamidoamine dendrimer (G7) multilayer film built on a uniform polystyrenesulfonate/poly(allylamine hydrochloride) multilayer precursor film.

The NaPSS/G7-1 DTAF multilayers were built on an uniform NaPSS/PAA HCl multilayer precursor film. Linear dependence of absorbance versus number of layers was obtained (FIG. 7). Under the same condition, the NaPSS/G7-10 DTAF multilayer films can also be constructed in a similar manner. However, no significant changes in slopes was observed. The reason will be discussed later. It has to be noted that the broken lines (jumps in the data) is due to the limitation of our UV spectrometer (baseline correction), rather than the polyelectrolyte film itself. Since without the baseline correction (when the instrument was stable), no significant changes in UV absorbance was observed no matter how long the film was stored.

This model system studies show that the functional groups such as electrically, optically, or biochemically active groups could be covalently attached onto the dendrimer prior to adsorption. It may also be possible to adsorb molecules from a solution mixture containing chromophores (with charges) and dendrimers in order to construct a blend surface which includes both chromophores and feasibility to build the next layer.

Figure 8:
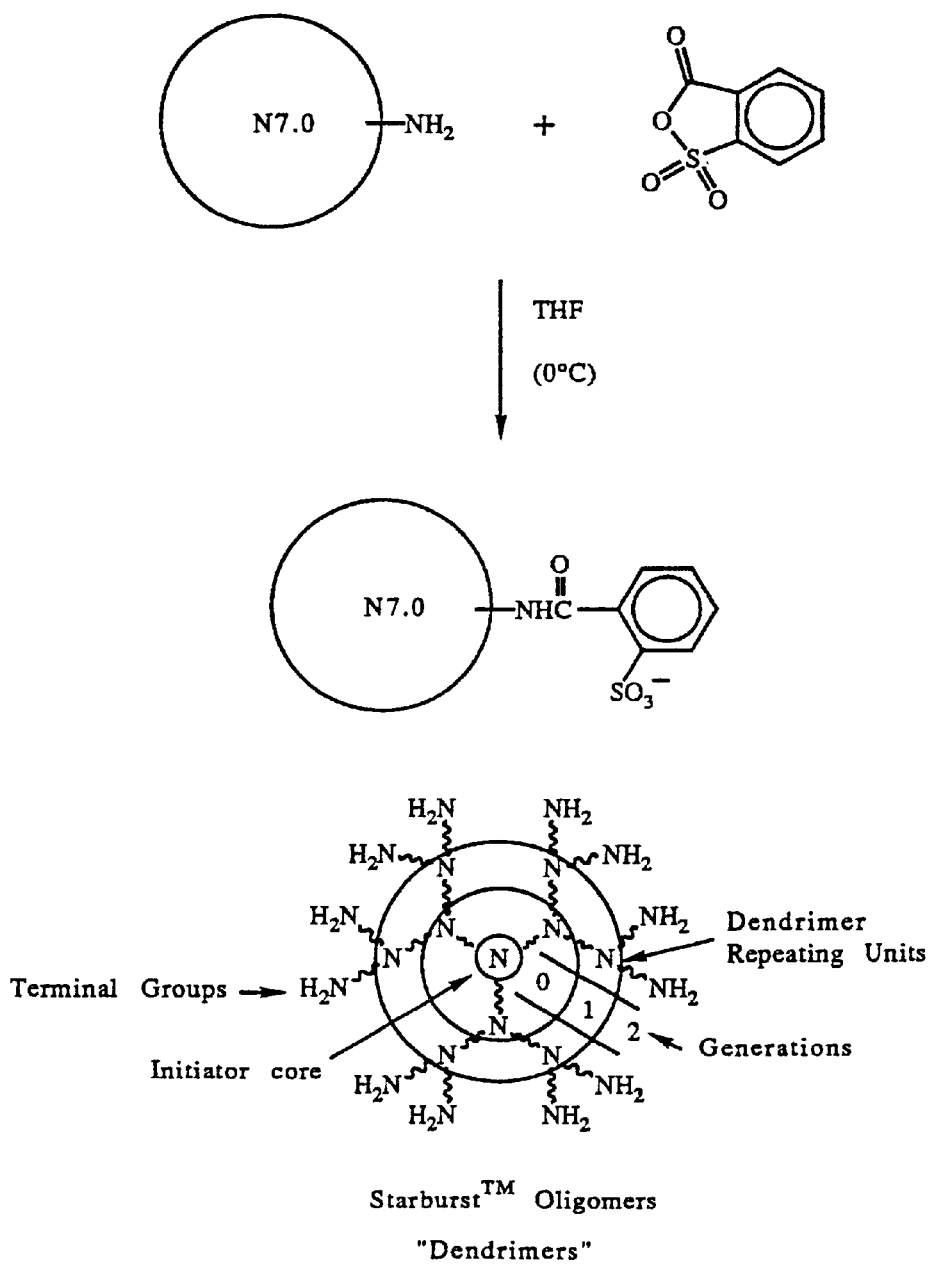
FIG. 8 shows a reaction scheme for the synthesis of a 2-sulfophenyl derivatized polyamidoamine dendrimer.
Figure 9:
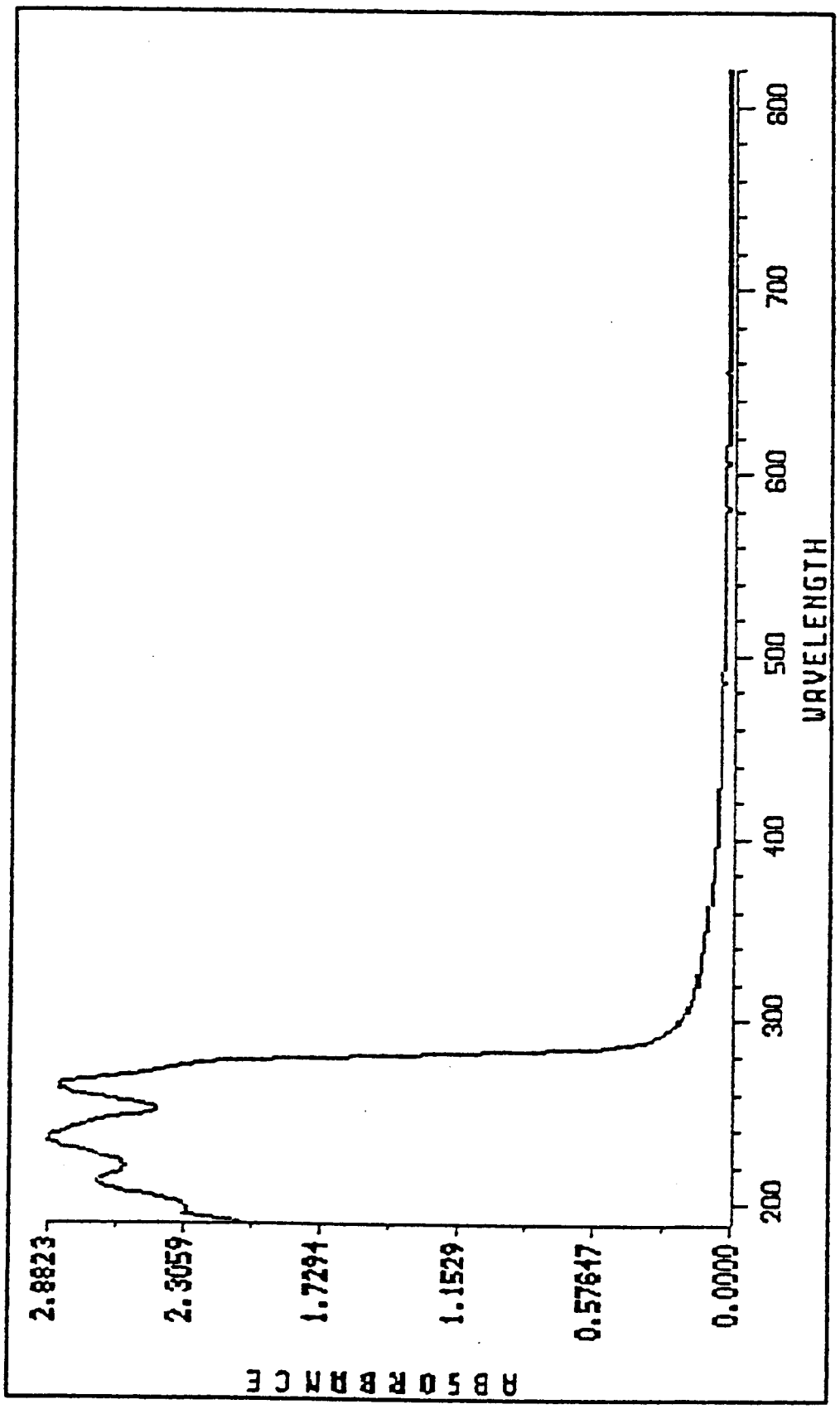
FIG. 9 is an ultraviolet spectrum of a 2-sulfophenyl derivatized polyamidoamine dendrimer.

5) Since there is no strong chromophore in PAMAM Starburst™ dendrimers, a chromophore and a charged end group have to be introduced during the dendrimer functionalization step so that the construction of dendrimer-dendrimer multilayers could be monitored by UV spectrometer. The first attempt was to react dendrimer (G7.0) with a large excess of 2-sulfobenzoic acid anhydride at 0° C. (Scheme II, FIG. 8). After extensive purification by ultrafiltration, the product was measured by a UV spectrometer. A strong sulfophenyl absorbance was observed (FIG. 9), indicating the formation of the functionalized dendrimer. However, when this sulfonated dendrimer was used to construct dendrimerdendrimer layers, no increase in UV absorbance was observed. This may be due to the formation of zwitterions. Since the adsorption has to be performed under acidic conditions in order to quatemize the —$NH_2$ end group, the interior of sulfonated dendrimers could also be quaternized. As a result, zwitter-ion dendrimers with an exterior negative charge (—SO$_3$—) and an interior positive charge (R$_4$N+) was formed (Scheme II, FIG. 8). The neutralized molecules would fall into solution immediately and the film was, therefore, destroyed.

6) Quartz Glass Surfaces.

Since the amino-modified quartz surface is relatively difficult to prepare, the quartz glass was directly cleaned with both acid and base solutions. It was found that a uniform polyelectrolyte multilayer thin film could be constructed on this substrate after about 5 NaPSS/PAAH bilayers. Although such a surface does not adsorb as many polyelectrolyte chains as the amino-modified surface, it provides a convenient way to clean the glass surface. The above results suggest that the quartz glass cleaned by a NaOH/EtOH solution (high basicity) could also be used directly for the construction of multilayer films.

7) pH and Molecular Size Effects.

Figure 10:
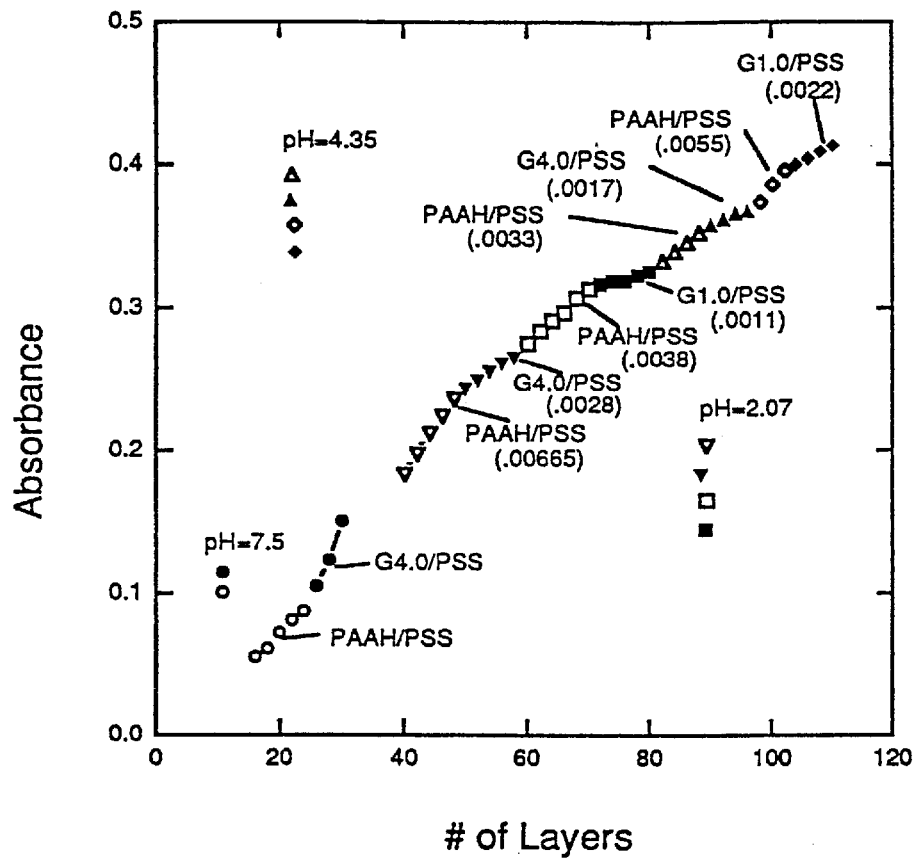
FIG. 10 is a graph of ultraviolet absorbance versus number of layers for a multilayer film comprising alternating polyamidoamine dendrimer/polystyrenesulfonate layers built on a precursor film comprising alternating layers of polystyrene sulfonate and poly(allylamine hydrochloride)

Three dendrimer samples G1.0 (d$_{exp}$=16 Å), G4.0 (d$_{exp}$=40 Å), and (d$_{exp}$=80 Å) were used to construct dendrimer/NaPSS multilayer films at pH values of 7.5, 4.35, and 2.07. All the dendrimerINaPSS multilayers were built on a NaPSS/PAAH multilayer precursor film. It was found that the adsorption of dendrimer onto NaPSS film is less dependent on dendrimer sizes, but more affected by the pH of the dendrimer solutions. As indicated in FIG. 10, the adsorption of dendrimer/NaPSS is less in acidic conditions than in basic conditions. In contrast to our expectation, further studies showed that the UV absorbance actually decreased upon the adsorption of the dendrimer onto the previous NaPSS layer, indicating partial desorption of NaPSS when in contact with a G7.0 solution. Such desorption was found to be more dependent on the dipping time and solution pH compared with that of PAA/NaPSS bilayers. Longer the dipping times and higher pH values result in larger desorption from the surface. However, surprisingly, the subsequent adsorption of NaPss layer on top of the dendrimer (G7.0 or G4.0) layer at pH 7.5 exhibited a larger increase in UV absorbance than seen for the PAAH/NaPSS bilayers and dendrimer/NaPSS bilayers in acidic conditions. Apparently, both adsorption and desorption were involved in the dipping process, and dendrimer/NaPSS layers are more sensitive to the changes such as pH and the dipping time.

This phenomenon may be qualitatively understood as follows:

G7.0 has 384 primary amines and 381 tertiary imines. Based on the amount of dendrimer used in this experiment (40 mg of G7.0 dissolved in 20 ml of 5M HCl solution, pH=7.5), we could calculate that only 60% of the terminal NH$_2$ groups were protonated by making the assumption that the initial site of protonation is at the primary amines. However, the interior tertiary imines may also be able to trap the protons. This could change the proton or charge distribution on the dendrimer surface, and, therefore, affect the adsorption of dendrimer-NH$_2$ onto the previous layers. This may explain the adsorption (slope) differences of the same dendrimer at different pH values, while in case of PAAH, no pH dependence was observed due to the absence of tertiary amines. The similar adsorption slopes obtained from NaPSS/G7.0-1 DTAF and NaPSS/G7.0-10 DTAF may also resulted from the pH effect, because both solutions were kept at pH=5-6.

Figure 11:
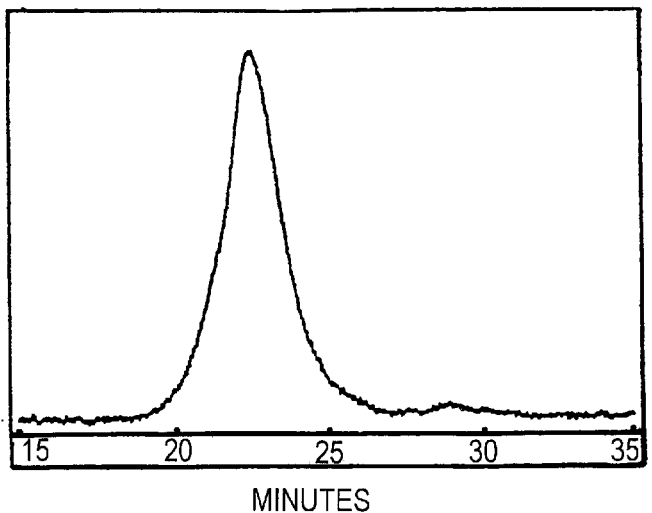
FIG. 11 is a size exclusion chromatograph of a cystamine core polyamidoamine dendrimer.
Figure 12:
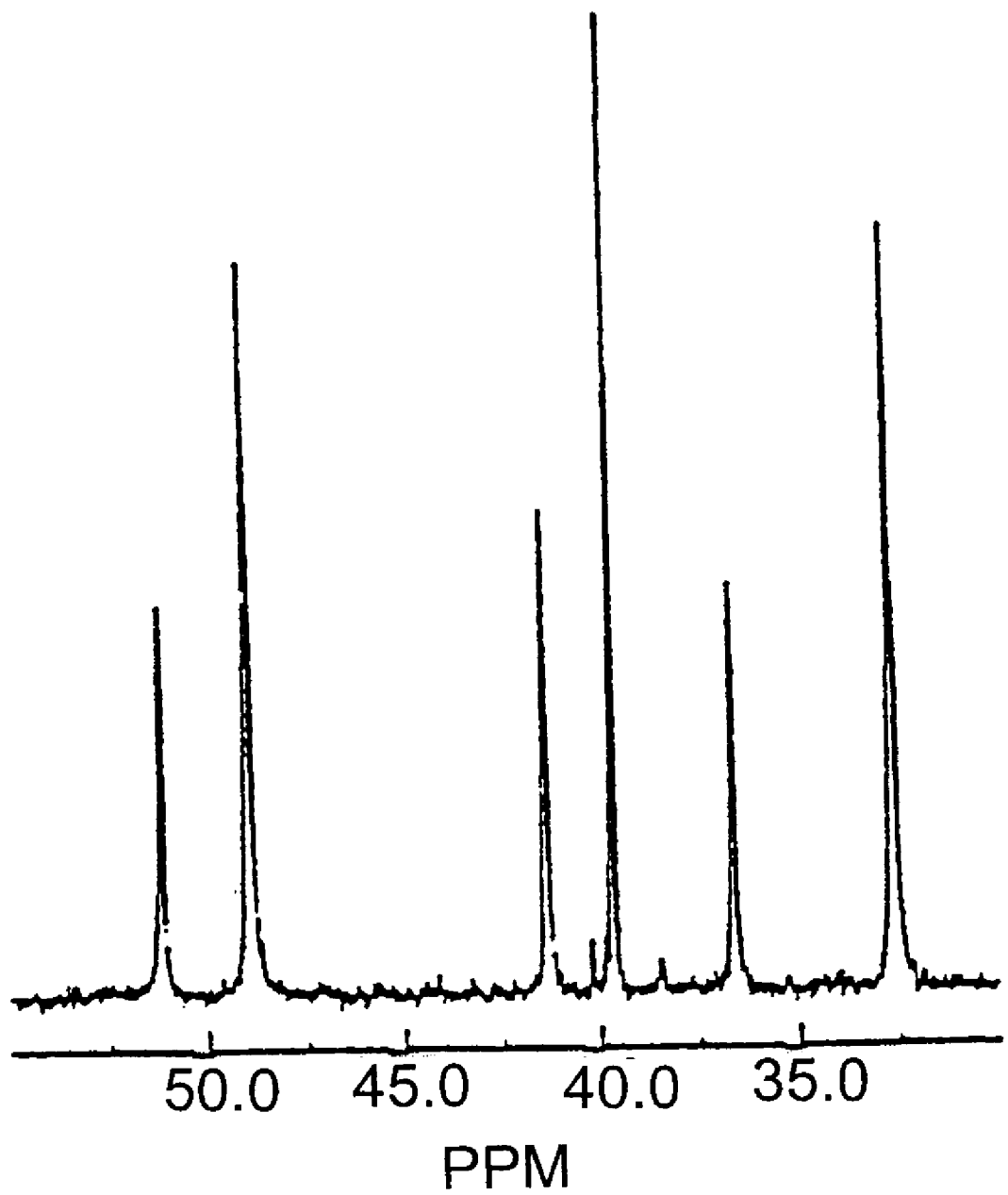
FIG. 12 is a nuclear magnetic resonance spectrum of the cystamine core polyamidoamine dendrimer characterized by size exclusion chromatography in FIG. 11.

8) Cystamine core dendrimer was synthesized as reported previously. The sample purity was checked by $^{13}$C NMR and SEC (FIGS. 11 and 12). A single cystamine core dendrimer layer was constructed onto a PAAH/NaPSS multilayer film, and then covered with more PAAH/NaPSS multilayers (Table I).

TABLE I

Reduction of the Cystamine Core Dendrimer Layer as Monitored by UV.

| Silicon Wafer Surface | Precursor (# of Bilayers) | Cys-NH$_3$+ | NaPSS/PAAH (# of Bilayers) | DTT or NaHCO$_3$ | DTT and NaHCO$_3$ | Time (hours) |
|---|---|---|---|---|---|---|
| —NH$_4$+ | >10 | G6.0 | 3 | X | √ | 2 |
| SiO$^-$ | >10 | G6.0 | 4 | X | √ | 2 |
| SiO$^-$ | >10 | G6.0 | 21 | X | X | 24 |

X: Reduction is not successful.
√: Reduction is successful.

Figure 13:
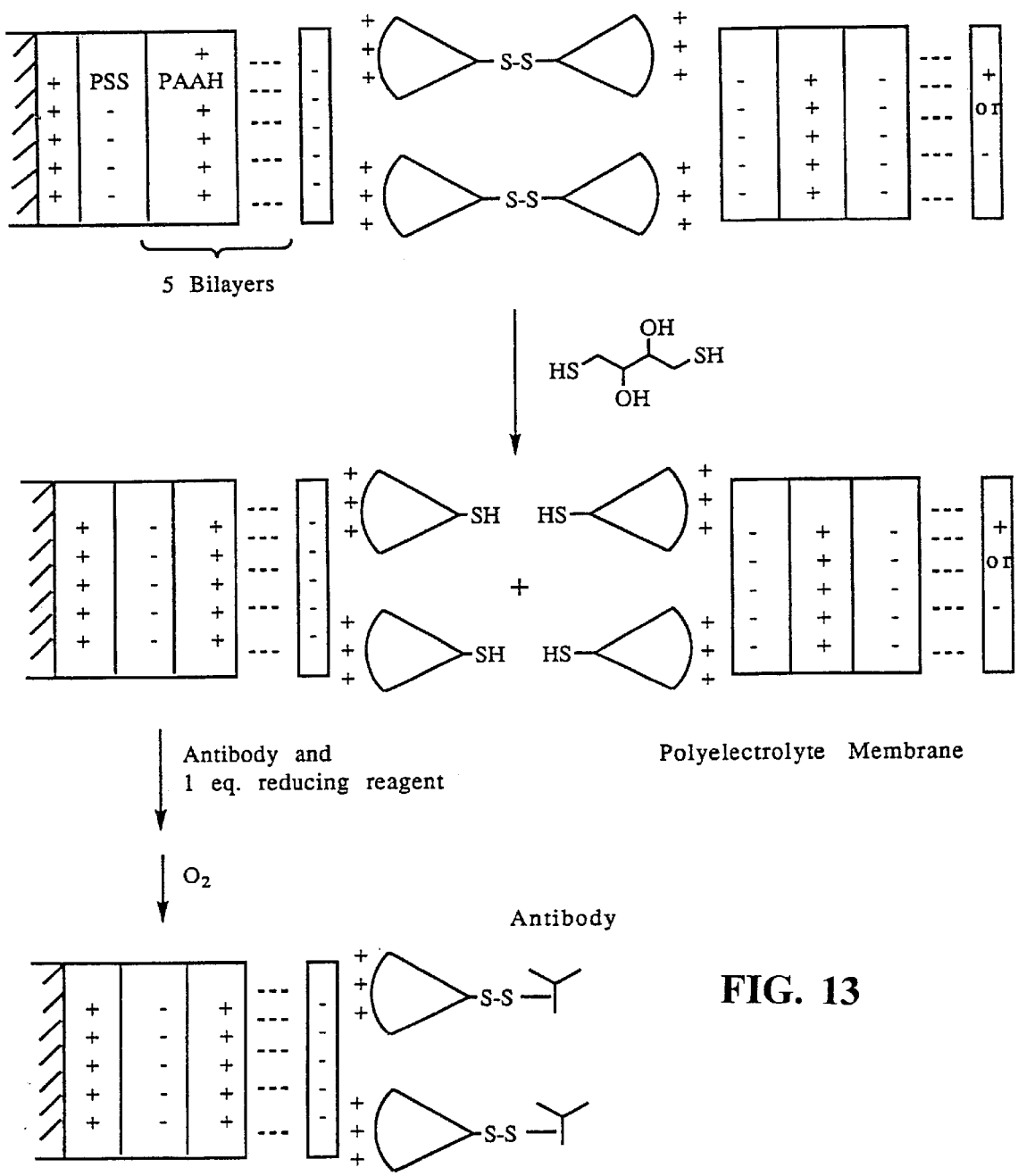
FIG. 13 is schematic representation of the reduction of a cystamine core polyamidoamine dendrimer layer using dithiothreitol.
Figure 14:
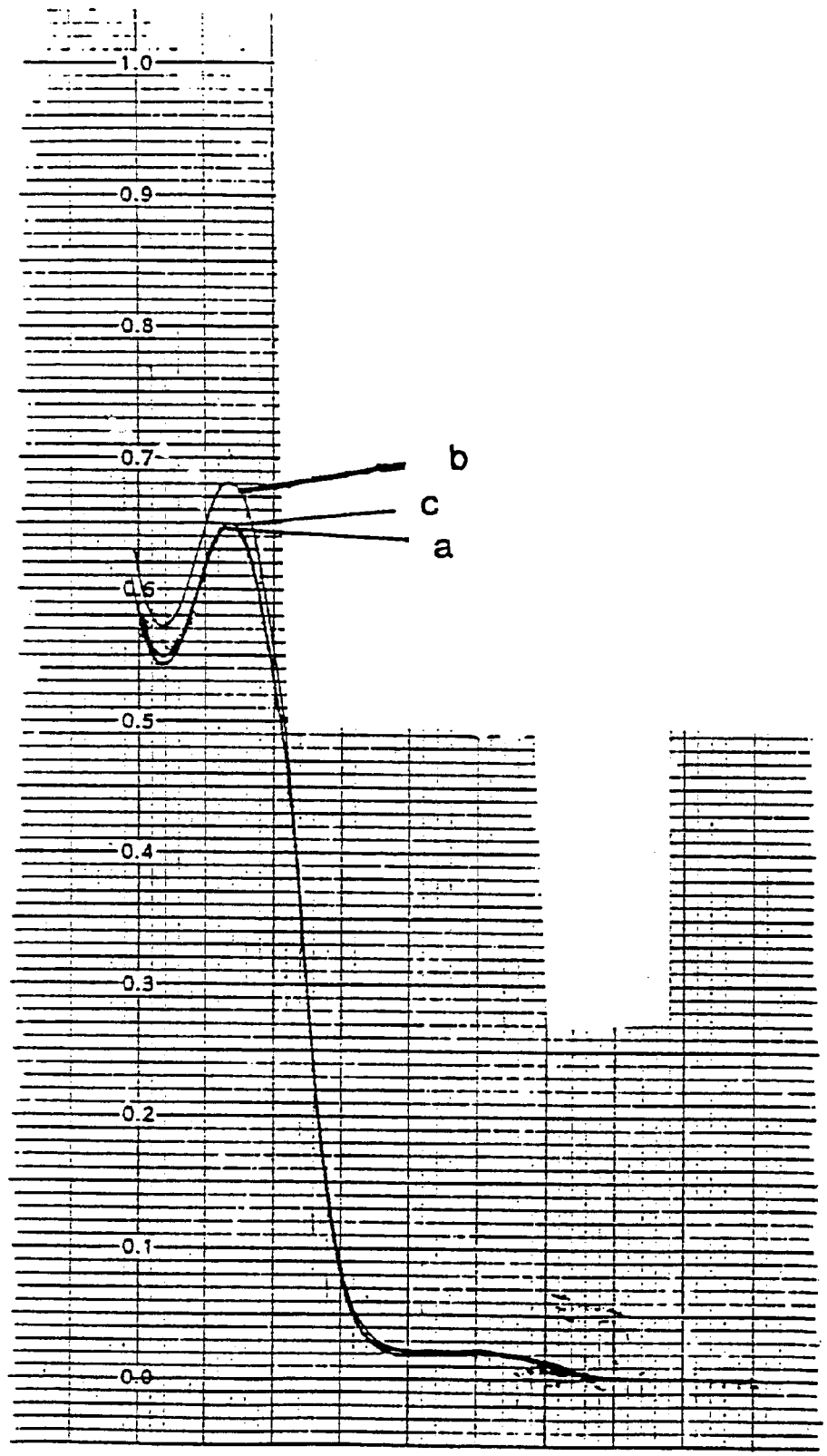
FIG. 14 shows a comparison of ultraviolet adsorption spectra for a cystamine core polyamidoamine dendrimer incorporated into a multiple layer film before and after reduction with dithiothreitol.

The reduction of cystamine core dendrimer layer was achieved in NaHCO$_3$ solution (pH=8) with large excess of dithiothreitol (Scheme III, FIG. 13). It was found that with lower coverage on top of the cystamine layer (3 or 4 PAAH/NaPSS bilayers) the reduction was very successful. The UV absorbance decreases to exactly where the cystamine core dendrimer was built, while without dithiothreitol no decrease in UV absorbance was observed (FIG. 14). The multilayer film cleaved from the surface is soluble in water. Unfortunately, the reduction of cystamine dendrimer layer with higher multilayer coverage (21 bilayers) was not successful probably due to the fact that the tightly packed polyelectrolyte multilayers sterically block the reactive sites (S-S bond).

The successful reduction of the cystamine core dendrimer layer at low coverage opens new applications in biomedical area. For example, most of the currently used immunoassays are based on double antibody layers. The first antibody layer is used as a biocompatible layer in order to increase the assay sensitivity, while the second antibody layer is served as molecular recognition sites for the assay test. In order to reduce the test cost, the first antibody layer could be replaced by a biocompatible dendrimer precursor layer. However, the difficult part is to attach the second antibody onto the dendrimer film without denaturing the proteins or enzymes. By utilizing the reduction reaction of the cystamine core dendrimer layer, a mercapto (—SH) monolayer would be formed on top of the dendrimer thin film, and the second antibodies could then be attached conveniently under the mild biological conditions. Biosensors, which comprised of an enzyme layer, could also be constructed in a similar manner. The advantage of this technique is that no separation procedures were involved and the bioconjugation could be directly achieved onto the solid surface.

On the other hand, such ultrathin dendrimer films could also be utilized in optical and electrical devices. The photo chromophores could be constructed through either S-S bond formation, ionic interactions, or covalently linked prior to adsorption. The resulting monolayer chromophore thin film may find applications in photo refractive index change, NLO, and wave guide. In addition, due to the availability of a large number of functionalized dendrimers and polymers, it may also find applications in batteries and capacitors.

DENDRIMER MODIFIED QUARTZ CRYSTAL MICROBALANCE

The Quartz Crystal Microbalance (QCM) instruments from two manufactures were used in this study. One was quartz crystal analyzer, QCA917 system from EG&G PAR Instruments, Princeton, NJ 08543. The other was the electrochemical quartz crystal nanobalance, EQCN-600 from ELCHEM, Postdam, NY 13676. Both models have the capability to do electrochemical measurements in a fast mode. The QCA917 model has a sample period of 0.1 to 10 second, while the EQCN-600 model has a sample period of 1 to 10 second. The QCM unit was controlled by an IBM PC 486 computer through a 16 bit data acquisition card. The computer system equipped with either a EG&G PAR model 270/250 research electrochemistry software or the VOLSCAN real time data acquisition software. The data collection for EQCM are automatic. Because of the data storage limitation of the software, the data collections for long time kinetic experiments were carried out manually. The calculated sensitivity of a 10 MHz AT cut quartz crystal operating in the fundamental resonant frequency mode is about 0.88 ng/cm$^2$ with an accuracy of 0.1 ng. The operating temperature was ambient without further control. The accuracy of the frequency measurements were not significantly effected by changes in the ambient temperature. The gold electrode was mounted horizontally in the experimental cell with two electrodes connected to the oscillator. During the EQCM experiments, only one side of electrode was exposed to electrolyte solution.

The gold coated AT cut quartz crystal was used as the working electrode and also as the frequency probe. The crystals were obtained either from International Crystal Manufacturing, Inc., Oklahoma City, or from EG&G PAR in an unpolished form. The gold coating layer, on both sides of the crystal, was about 3000 Å which was deposited on top of a 200 Å thick of titanium underlayer. The reference electrode was a saturated calomel electrode (SCE). The counter electrode was a platinum wire electrode. The gold electrode was washed with deionized water, repeatedly with absolute ethanol, and then stored in deionized water. The gold electrode was rinsed with water or ethanol prior to the EQCM experiments.

Potassium nitrate, 99.99+%, is obtained from Aldrich Chemical, Lot #12922PF, and was used without further purification. Anhydrous sodium perchlorate was obtained from Alfa/AESAR, Johnson Matthey, Lot #K12B35, and was used without further purification. Ferrocene was obtained from Aldrich Chemical, Lot #11213TF. This compound was purified by twice recrystallation from ethanol. Anhydrous methyl alcohol was obtained from Aldrich Chemical, Lot #32288EF, and was used without further purification. Potassium ferricyanide, 99.0+%, was obtained from Aldrich Chemical, Lot #08225HZ, and was used without further purification. Octadecyl mercaptan, 98% purity, was obtained from Aldrich Chemical, Lot #0937AF, and was used as received.

Results and Discussion

A. Introduction of QCM

The technique and various applications of quartz crystal microbalance (QCM) has been reviewed recently by Ward and Buttry (for example see, Science 1990, 249, 1000). In the past few years, several groups have demonstrated that QCM can be used as a mass-sensitive detector at the solid and solution interface. Some of these studies have also combined QCM with simultaneous electrochemical studies.

The basic principle of QCM is that an alternating electric field applied across a piezoelectric material, such as quartz crystal, induces a shear stress in that material. The vibration frequency of this shear stress of the quartz crystal is in the megahertz region. Therefore the changes in mass of the adsorbates on the surface of the piezoelectric quartz oscillator can be monitored by the changes in the vibrational resonance frequency of the oscillator. QCM is extremely sensitive to the presence of the surface-confined adsorbates.

In 1957, Sauerbery worked out the mathematical relationship between the frequency changes, $\Delta f$, of the quartz crystal and the mass changes, $\Delta m$, on the surface of the crystal:

$$\Delta f = \frac{-2f_o \Delta m}{A\sqrt{\rho_s \mu_p}}$$

where $\rho=2.648$ g/cm$^3$, is the density of quartz; $\mu=2.947\times 10^{11}$ g/cm.S$^2$, is the shear modulus of AT cut quartz, A is the active surface area of deposition, and $f_o$ is the fundamental resonant frequency. There are two basic assumptions involved in the deduction of the above equation: 1) the foreign deposition can be treated as an extension of the quartz crystal, i.e., the absorbed layers are of rigid behavior; 2) the distribution of mass on the entire reactive portion of a AT-cut quartz crystal is uniform. One of the strengths of the use of QCM as mass sensor is that kinetic processes in thin films can be followed in real time. By combining the QCM system with an electrochemical measuring system (potentiostat/galvanostat), one can measure not only the current and the potential, but also simultaneously measure the change in the resonant frequency and in the resonant resistance of the quartz crystal associated with electrochemical processes taking place at the electrode surface. Thus, examination of the changes in either mass or viscoelasticity accompanying an electrochemical reaction on the electrode surface is possible. In this study, we apply the techniques of QCM and electrochemical quartz crystal microbalance (EQCM) to study the adsorption phenomena of a PAMAM dendrimer at an electrode surface in order to check the feasibility of utilizing dendrimer-modified electrode as a sensitive medium for biosensor study.

B. Absorption Studies for Self-assembly Process

Figure 15:
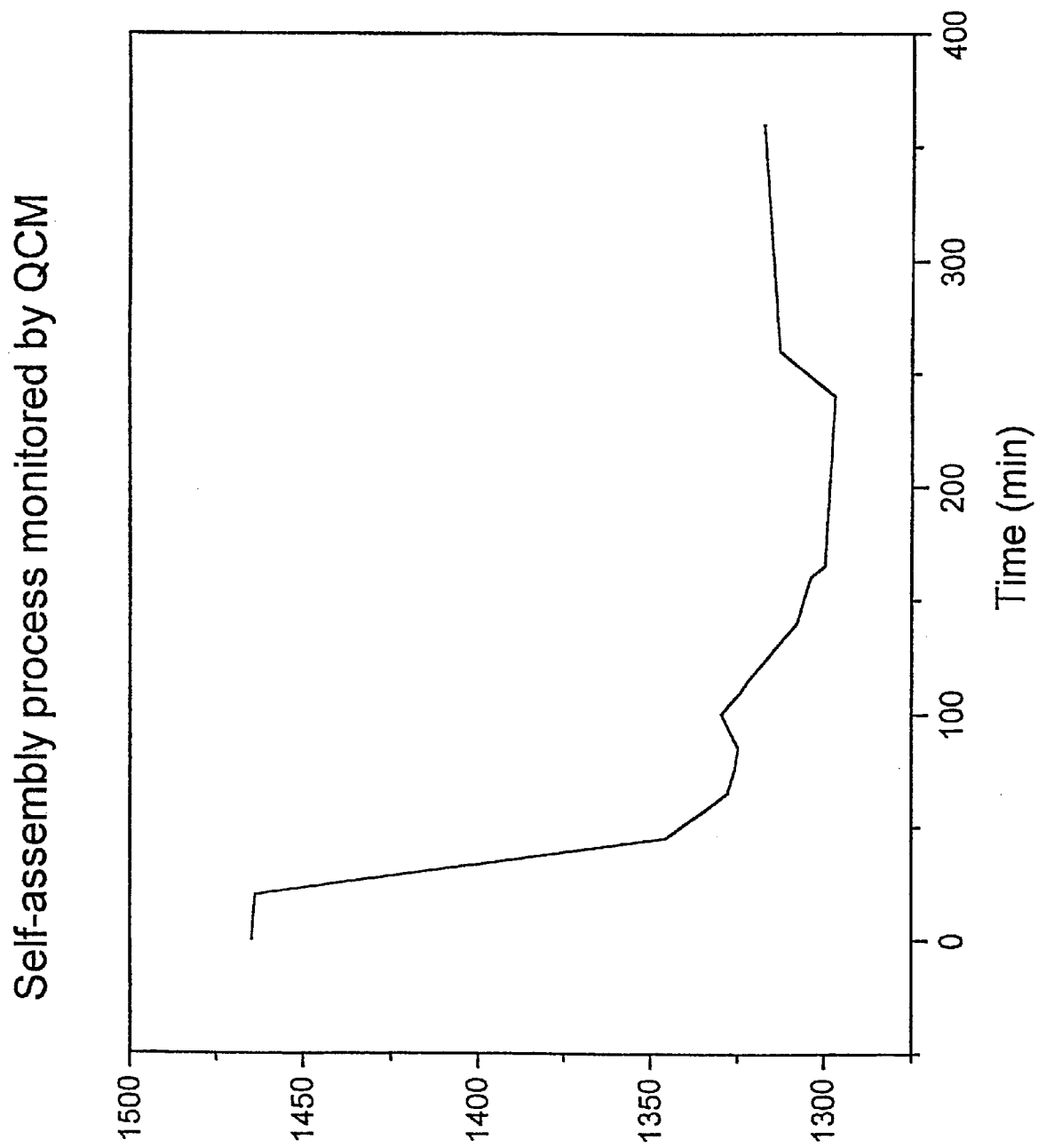
FIG. 15 is a graph of oscillator frequency versus time for a quartz crystal microbalance electrode onto which a cystamine core polyamidoamine dendrimer is being adsorbed from an ethanol solution.

FIG. 15 shows the adsorption result for cystamine core PAMAM dendrimer (G0) in ethanol solution onto the gold-coated surface of the QCM electrode. The frequency response is typical of that seen for the self-assembly of long chain thiols and disulfides onto a gold surface. In these experiments, the frequency changes should correlate to the mass change resulting from the covalent linking of dithio moiety or mercaptan group to the gold surface. Although the mechanism of adsorption process is not quite clearly understood, the experimental evidence supports the Au-S bond formation. The general accepted process is shown as follows:

R—S—S—R+Au→R—S—Au

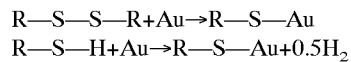

We will test this mechanism for the case of adsorption of cystamine core PAMAM dendrimers to a gold surface by applying different bias potentials between the electrodes.

For the first experiment, a 4×10$^{-5}$M solution of cystamine G0 dendrimer in ethanol was exposed to the gold surface of the QCM. FIG. 15 shows one of the strong features of QCM, that is the real time, quantitative monitoring the mass change at the electrode surface is possible. The frequency gradually reached a plateau value after about three hours, which indicated a relatively fast assembly process of disulfide linkage of the G0 dendrimer on to the surface of the gold substrate. For the case of long chain mercaptans, the equilibrium process normally required more than ten hours in organic solvents. As shown later in this report, this adsorption process could be accelerated by changing solvent from ethanol to an aqueous solution. The frequency change shown in FIG. 15 is on the order of 168 Hz, which corresponds to the mass change of 16.8 ng on the surface of the electrode.

By assuming that the cystamine core PAMAM dendrimer (G0) forms a monolayer on the surface of the gold substrate, then the surface coverage of dendrimer molecules on this quartz crystal should be of $2.93 \times 10^{-11}$ mole resulting in a mass changes for ideal monolayer adsorption is on the order of 17.8 ng. This value is in fairly good agreement with the experimental observation. Therefore, the experiment data for the adsorption of cystamine core G0 dendrimer onto the gold surface from an ethanol solution indicates that the dendrimers self-assemble into a closed, tight packed state. Apparently, this low generation dendrimer can pack onto the gold surface with very little inhibition due to steric congestion. Also control experiments were run with dendrimer that were made from nonreactive EDA core rather than reactive cystamine core molecule and these dendrimers showed no significant adsorption to the gold electrodes.

Figure 16:
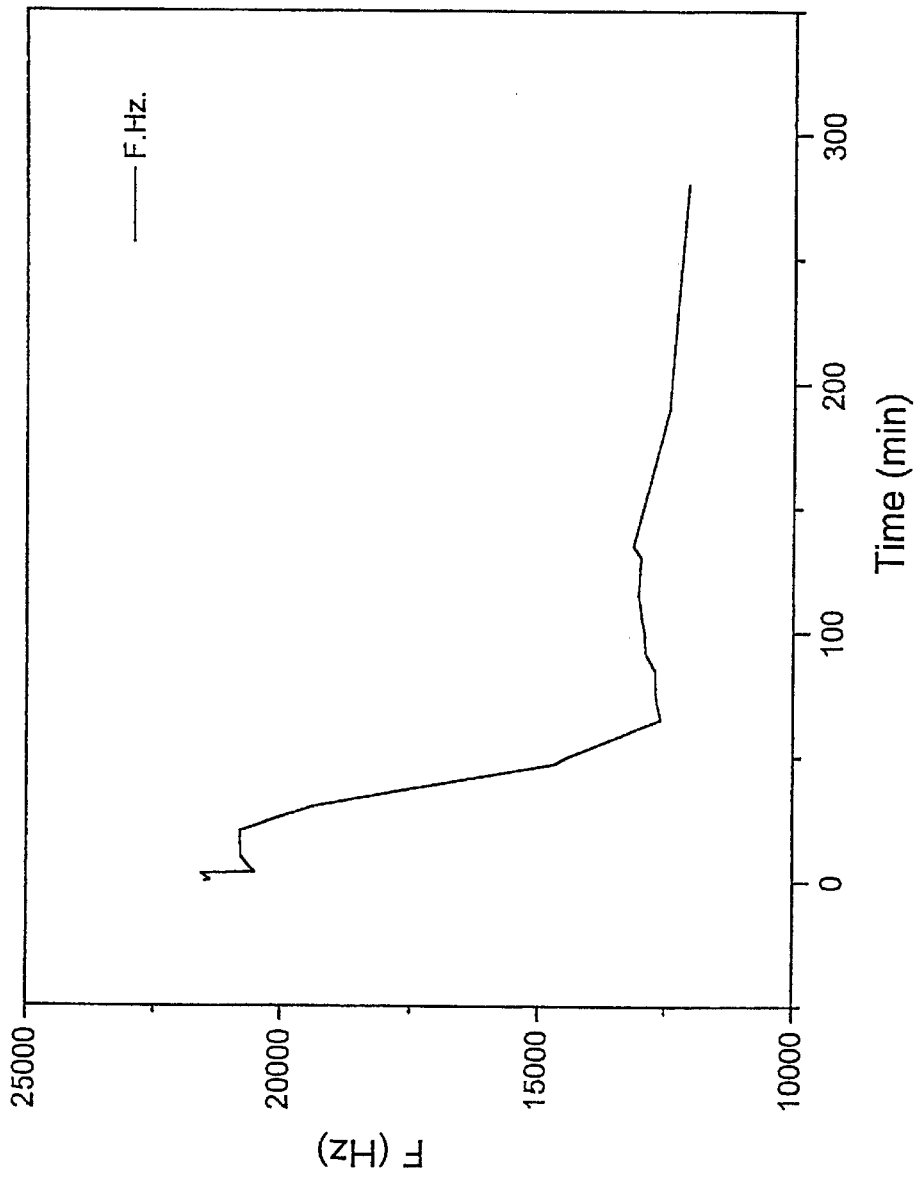
FIG. 16 is a graph of frequency versus time for a quartz crystal microbalance electrode onto which a cystarnine core polyamidoamine dendrimer is being adsorbed from an aqueous solution.

FIG. 16 shows the frequency change associated with the absorption of cystamine core PAMAM dendrimer G0 onto a gold surface from an aqueous solution. The concentration of dendrimer was about $4 \times 10^{-5}$M, and as in the previous experiment, no bias potential applied across the electrodes. The aqueous solution was buffered to a pH of 2.0 with $H_3PO_4$. The frequency change observed due to the adsorption of dendrimer onto the gold substrate was on the order of 8790 Hz, which corresponds to a mass change of 87.9 ng. This mass increase was significantly larger than the ideal monolayer coverage on the gold substrate that was discussed above. We have two explanations for the increase of mass on the surface at the lower pH. We have previously reported that the diameter of the PAMAM dendrimers become smaller in an acidic solutions, and therefore a higher packing density could be obtained on the gold surface. This effect is most likely too small to completely explain the increase in mass observed at acidic condition. A second possibility for the observed enhanced mass change is suggested by the previous studies of the self-assembly of long chain mercaptans or disulfide molecules on gold surfaces which showed multilayer formation due to the hydrophobic interaction of the hydrocarbon tails of these molecules. This effect has been observed in both aqueous and polar organic solvents. Even though our dendrimer molecules are not hydrophobic, it is still possible that after the formation of first chemsorption monolayer, additional layers of dendrimers were then physical absorbed to the chemisorbed monolayer. The multilayer absorption of dendrimer can be explained by the strong interaction, primarily through hydrogen bonding, between the dendrimer molecules in acidic conditions. This interaction favored equilibrium of the dendrimer-gold assembly towards the surface region. The pH of aqueous solution partially charged some of the amine functional groups of dendrimer molecules. This was a very important aspect since it could have a concentration effect of making more dendrimer molecules onto the aggregates state which favor the multilayer formation.

Figure 17:
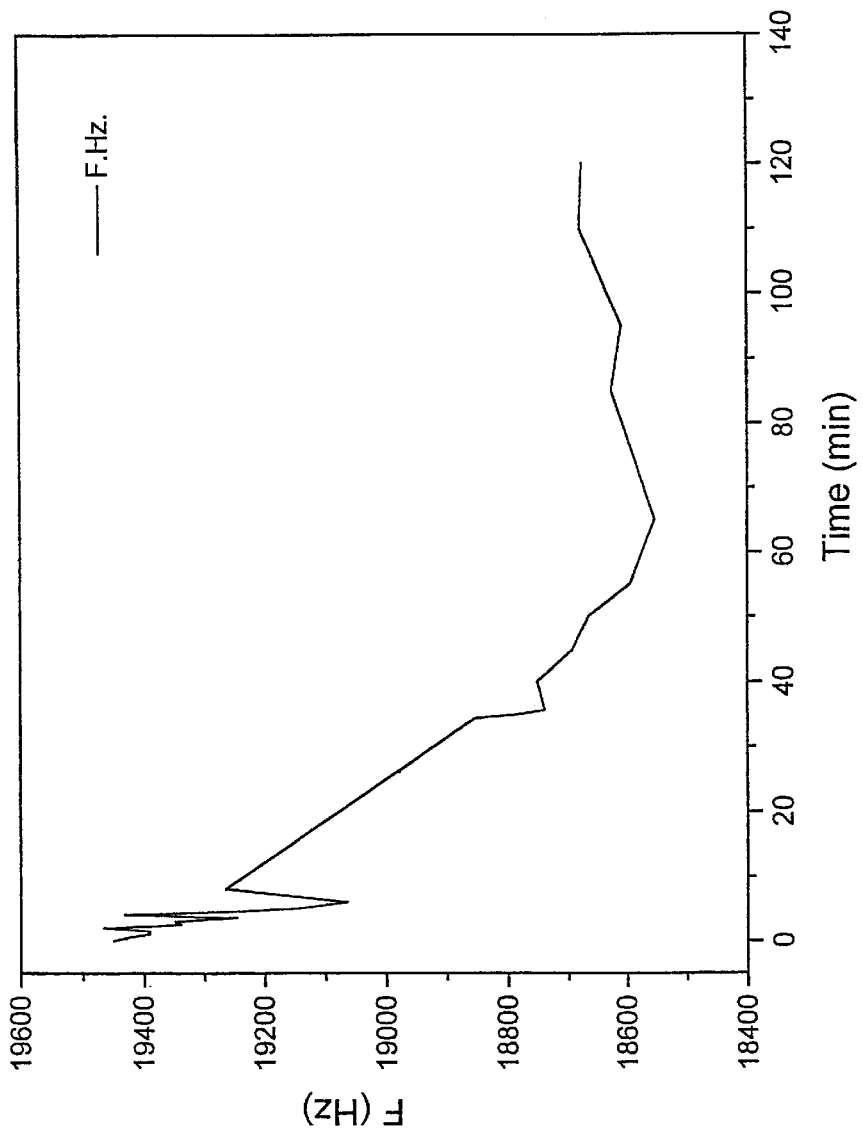
FIG. 17 is a frequency-time plot of adsorption of a cystamine core polyamidoamine dendrimer onto a quartz crystal microbalance electrode at the same pH as in FIG. 16 (pH of 2.0), but with an externally applied potential of 500 mV across the electrodes.

FIG. 17 shows the frequency-time plot of adsorption of cystamine dendrimer onto a gold substrate at the same concentration and pH in the previous experiment but this time an external applied potential of 500 mV was applied across the electrodes. As shown here, the frequency change associated with the adsorption process decreased dramatically in comparison to the adsorption results obtained for both the non-biased experiment in water and also the ideal adsorption case from ethanol. The frequency change was on the order of 900 Hz, which translates into the mass increase of 9.0 ng on the quartz crystal. This mass increase is only about half of that for the ideal dendrimer monolayer coverage of the gold substrate. This effect might be explained by the positive biased electrode surface (in oxidized state) acting to repel the positively charged dendrimers away from the gold surface. The alternative rationalization is that the presence of double charge layer prevents the full occupation of the gold surface by the cystamine dendrimer molecules. The counter ions, under this condition, also could take some of the available spots of the surface.

Another interesting point of FIG. 17 was that the adsorption kinetics was faster than that of the previous case, i.e., the non-biased adsorption in aqueous solution or in ethanol solution. This is reasonable in the light of the electrostatic interactions between the partially charged dendrimer species and the gold surface. It is the same charge presence block further interaction after the initial chemsorption of cystamine dendrimer molecules. If this is true, then when negative external biased potential was applied into the same solution, the adsorption of cystamine dendrimer molecules onto the gold substrate surface should be more favored in both kinetic and thermodynamic terms.

Figure 18:
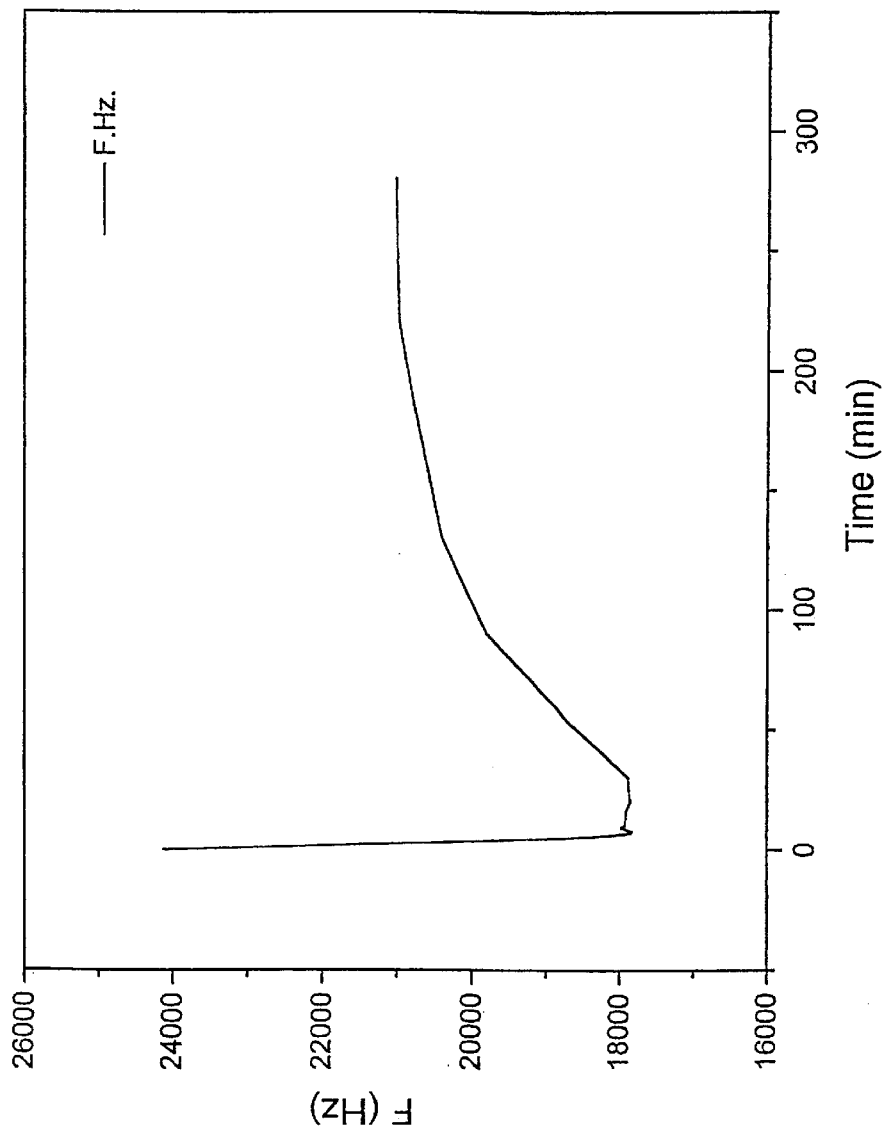
FIG. 18 is a frequency-time plot of adsorption of a cystamine core polyamidoamine dendrimer onto a quartz crystal microbalance electrode at a pH of 2.0, with an externally applied potential of –500 mV.

The effect was confirmed by applying a negative potential across the electrodes. As shown in FIG. 18, the adsorption result of cystamine core dendrimer of $4 \times 10^{-5}$M onto the gold electrode surface. The pH of this buffered solution was about 2.0, and an applied bias potential was −500 mV. It is rather interesting to see that there are actually two processes involved during the adsorption experiments. The initial frequency response under the negative biased potential was a faster adsorption process than any of the previous experiments. The frequency decreases rapidly on the order of 6230 Hz, which converts to the mass decrease of 62.3 ng. Then the adsorption process was followed by a relatively slower frequency increase which eventually reached a plateau after ca. 230 minutes. The frequency change of the second process was on the order of 3124 Hz, which corresponds to the mass changes of 31.2 ng.

These two processes can be understood by considering the effect of the external electric field. The first frequency decrease was an adsorption of cystamine core dendrimer molecules onto the gold surface which as accelerated by driving the positively charged dendrimers to the electrode with the presence of the negative applied electric field. As was previously shown in FIG. 16, multilayer formation again occurred after the first chemisorbed monolayer anchored to the gold surface. However the magnitude of mass change didn't reach the same level as in the unbiased experiments. The second, slower process was attributed to the electrochemically-driven desorption of the chemisorbed dendrimer molecules in the formed multilayer back to aqueous solution. This reductive process, which was influenced by the negative applied potential, usually came with the increase of frequency. This has been previously reported by several groups in studies of the electrochemically-driven desorption of self-assembled, long chain thiol monolayers on gold electrode surface.

The FIG. 18 results indicated that there was only about half of the absorbed materials came off the gold surface. The final stabilized cystamine core dendrimer films consisted of about one bilayer. Certainly this could also be attributed to the adsorption of solvent molecules trapped inside the cystamine core dendrimer. Considering the loose packing state of the cystamine core dendrimer molecules under external electric field, the latter explanation is more favorable. We also can not exclude the possibility of bilayer formation form the interdigitation of cystamine core dendrimer molecules. This complex observation is not surprising when compared with other literature reports of long chain mercaptan or disulfides. Both solvent trapping and interdigitation rationalizations have been reported.

In conclusion, the QCM and EQCM experiments are very powerful in studying the adsorption process of cystamine PAMAM dendrimer onto the gold surface. The solvent has strong effect on both kinetics and final self-assembly states. In ethanol, the adsorption process is slow but the final equilibrium state is close to perfect monolayer. On the other hand for the experiments in an aqueous solution, which most closely resemble the real sample conditions that would be encountered in a wide number of applications, the self-assembly adsorption process of dendrimer is more rapid but a multilayer film forms at the equilibrium state. These results have also demonstrated that the applied external electric field has a profound effect on the self-assembly adsorption processes of the cystamine dendrimer on the gold electrode surface. The large dendrimer molecules cannot pack into closed perfect monolayer like the long chain thiol or disulfide. Furthermore, the charge presence has strong impact on the self-assembly monolayer of dendrimers.

C. Electrochemical Studies of Self-assembled Dendrimer Films

These experimental results were divided into two parts. The first study concerned the electrochemical stability of the dendrimer coated gold electrode surface in a pH buffered electrolyte solution. The second part focused on the incorporation of metal ions, copper(II), into the self-assembled dendrimer films. However, as shown later, in both cases the frequency response measured from QCM was not clear enough to give meaningful results. This is mostly due to the high noise level involved in the experiments. Plausible causes are provided.

Figure 19:
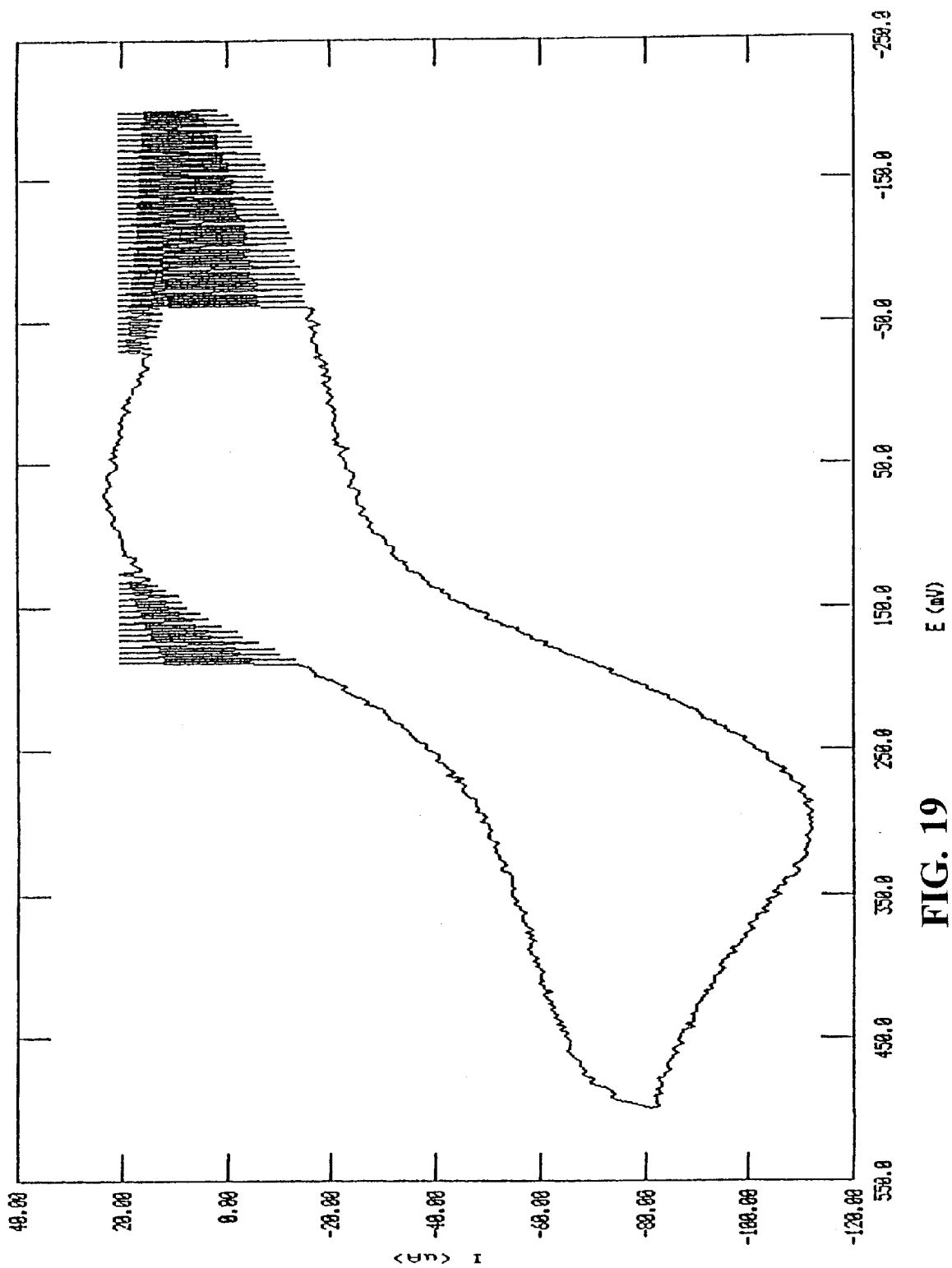
FIG. 19 is a cyclic voltammetry graph of an electrochemical quartz crystal microbalance calibration standard comprising 0.1 M $K_3Fe(CN)_6$ in a 0.1 M $NaNO_3$ aqueous solution.
Figure 20:
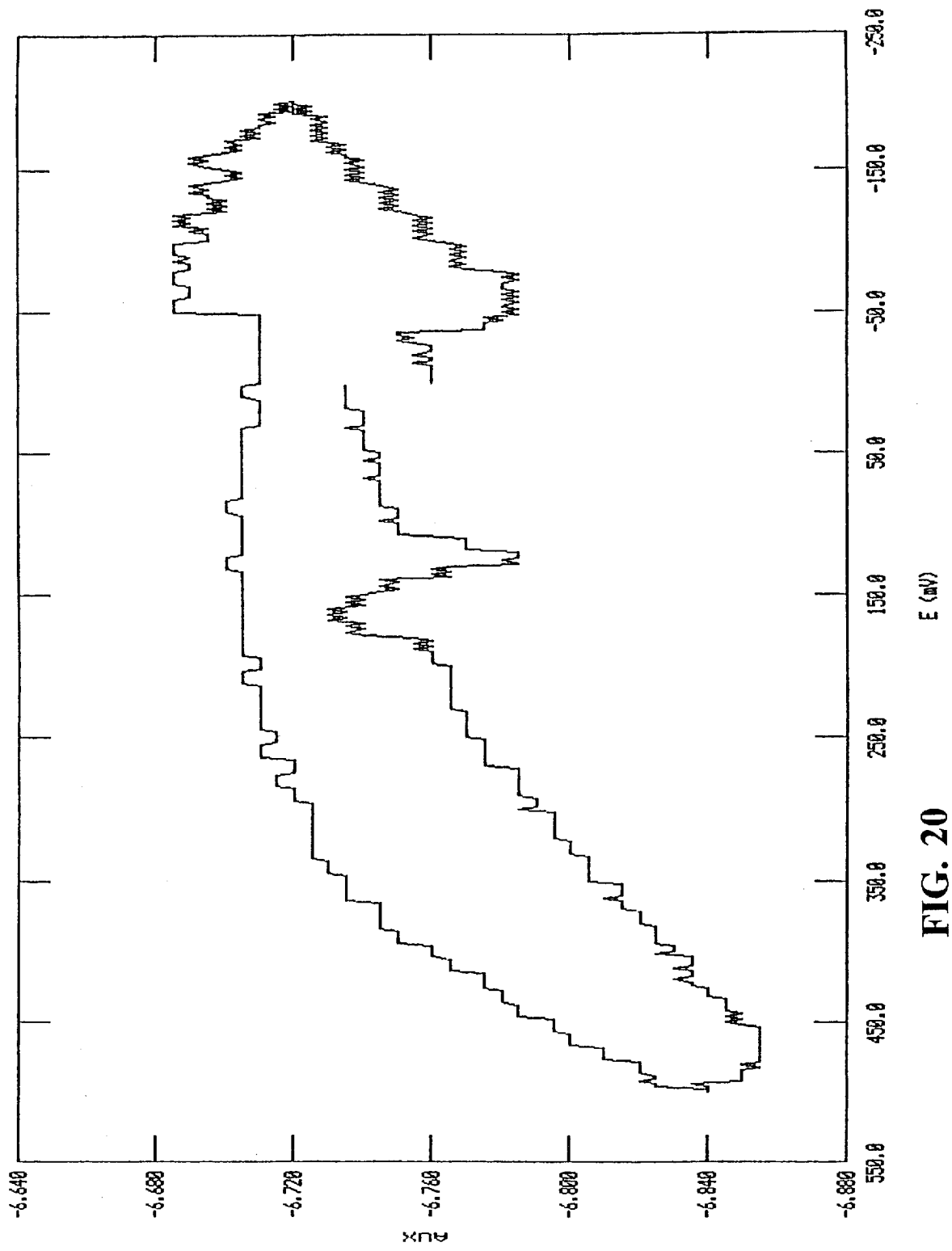
FIG. 20 is a graph of the quartz crystal microbalance frequency response of the cyclic voltammagram shown in FIG. 19.

The EQCM calibration experiments, as a blank check of our electrochemical system, were performed with 0.1 M $K_3Fe(CN)_6$ in 0.1 M $NaNO_3$ aqueous solution. The solution was buffered to pH of 2.0 either by HCl or HNO3. The cyclic voltammetry results are shown in FIG. 19. The scan rate was 100 mV/s, and two cycles of the potential scan were typically run. The potentials were referenced to SCE. The cyclic voltammetry curve was symmetric, but was not totally reversible in the case of fast scan rate. This may be due to the small area of gold electrode surface which can have some slow down effects on the cyclic volumetric scanning. The QCM frequency response of the cyclic voltammetry is shown in FIG. 20. The absolute value of frequency was small in comparison to that seen for the adsorption of dendrimer. The change in mass was only on the order of 0.2 ng. However this result did show the sensitivity of the EQCM technique which is capable of detecting even small changes in mass at an electrode surface. The oxidation and the reduction process of the Fe(II)/Fe(III) couple did not result in any significant mass changes, as would be expected. This is easy to understand while considering the fast diffusion rate of these electrolytes.

Figure 21:
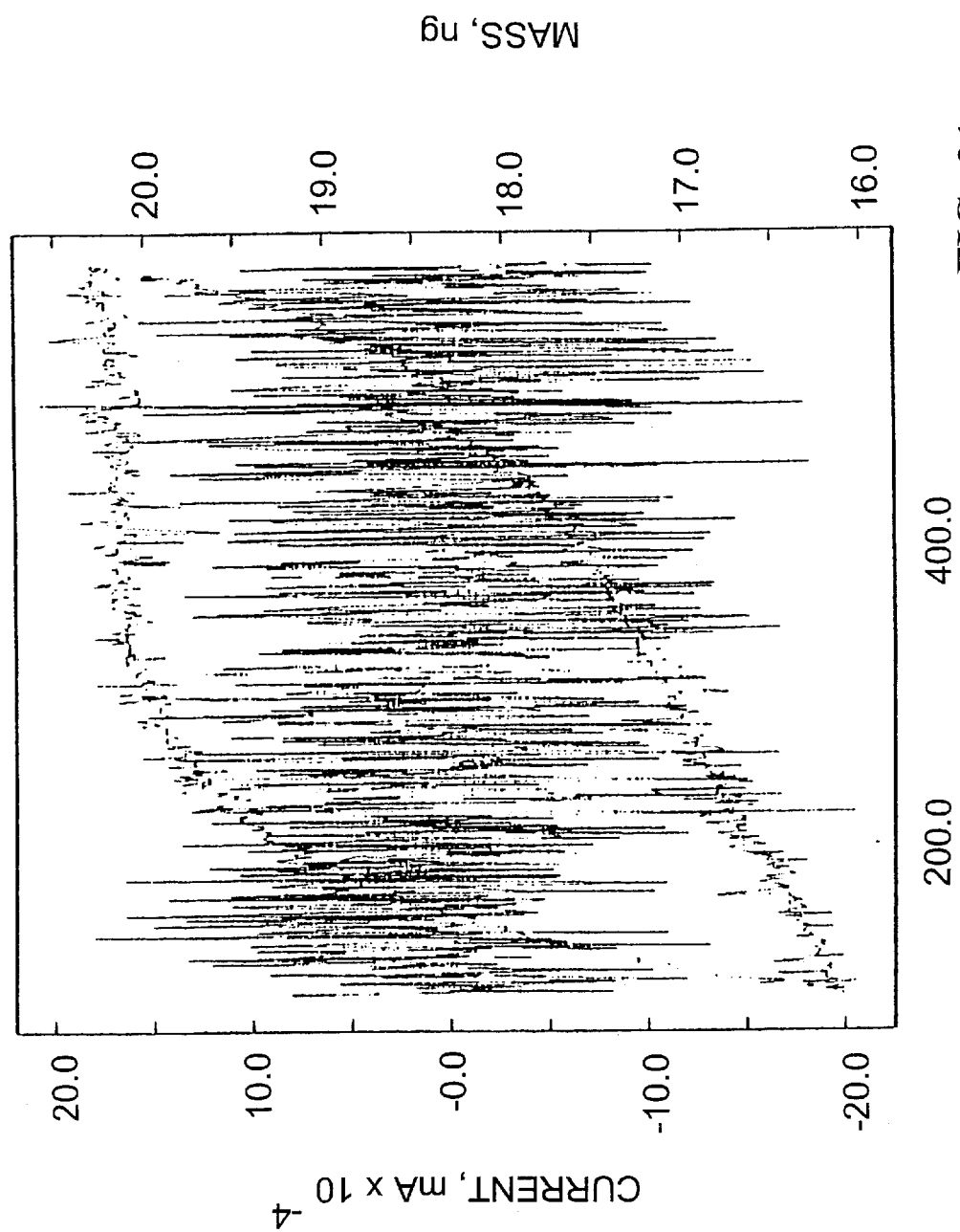
FIG. 21 shows the cyclic voltammetry results and the corresponding frequency changes associated with redox cycling of a preformed self-assembled cystamine core polyamidoamine dendrimer film adsorbed on the quartz crystal microbalance electrode from a buffered aqueous solution.

FIG. 21 shows that the cyclic voltammetry results and the corresponding frequency changes associated with the redox cycling of the preformed self-assembled cystamine PAMAM dendrimer film in pH buffered aqueous solution in EQCM experiments. The supporting electrolyte was $10^{-4}$M $NaNO_3$. The CV voltamagram clearly shows that the surface bounded G0 cystamine dendrimer molecules block the charge transport from the solution phase to the electrode surface. Similar ill-defined CV patterns has been previously observed during the electrochemical studies of self-assembled long chain thiol monolayers in both organic or aqueous media. Since the charge transport was slow and the signal/noise ration of QCM was also low, the current-potential graph was broad. Due to the low concentration of electrolyte in this experiment we were not able to differentiate whether charge transport was being limited by the coating of dendrimer onto the surface of gold electrode.

For the most experiments we studied the frequency response was obstructed by the low S/N ratio. Therefore the mass change associated with the redox process was not clearly defined. This could be due to two possible mechanisms. The first mechanism involves the limited charge transfer through the multilayer of dendrimer attached to the surface of gold electrode. This limited charge transfer through the self-assembled monolayer results in a frequency response which could not be clearly seen. Furthermore, the kinetics of dendrimer molecular species attaching to or coming off from the gold electrode surface was much slower than the charge transfer rate, so the frequency changes could not be shown under this condition. The second rationalization was the large chunk of physically adsorbed dendrimer molecules moved together as one species, such as an aggregate, which induced the high S/N ratio in the cyclic voltammetric process.

This intrinsic problem can be overcome for biosensor applications since the mass changes associated with most biomolecules is pretty large so the mass change upon capture can be large enough to balance the low S/N ratio.

Figure 22:
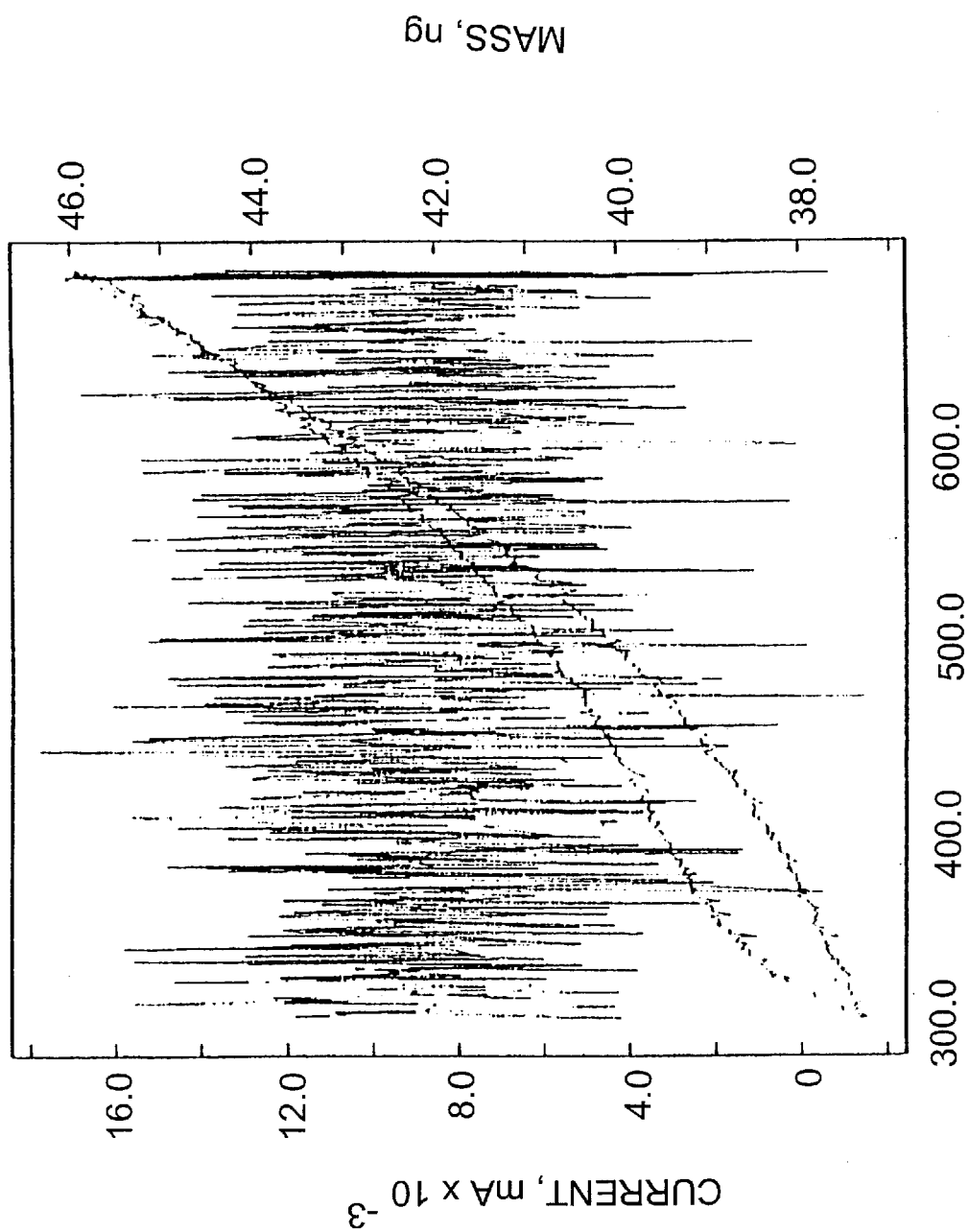
FIG. 22 is a cyclic voltammetry results for the sample used in FIG. 21 scanned over a larger electrochemical potential range.
Figure 23:
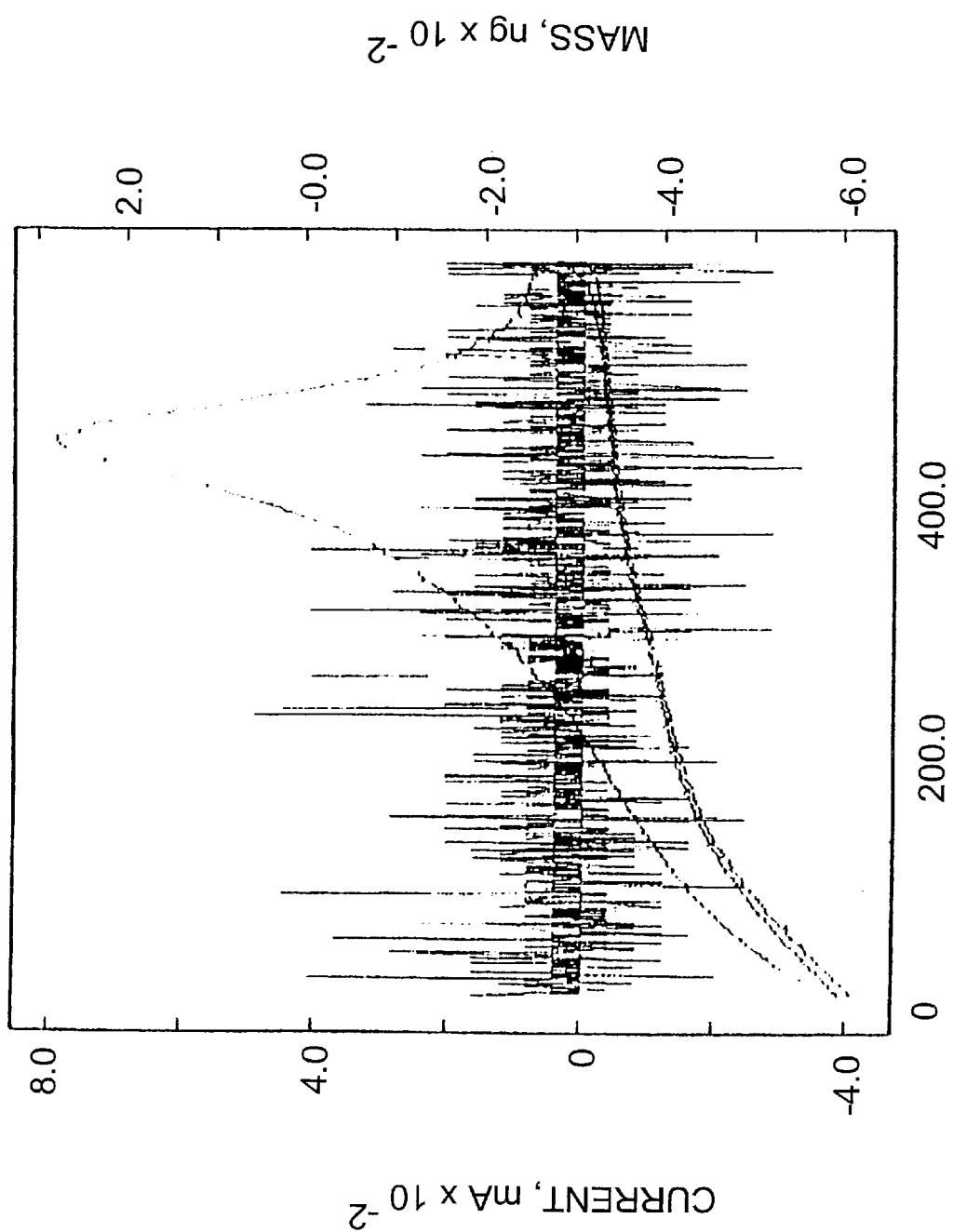
FIG. 23 shows the cyclic voltammetry results for the sample of FIGS. 21 and 22, but at a higher electrolyte concentration.

The FIG. 22 shows that the same sample scanned over a larger electrochemical potential range. Please note that the scale was different. The cyclic voltamagram diagram shows similar behavior as is seen in FIG. 21. The electrolyte concentration was low so that the charge transfer rate was very small. This system was stable up to 800 mV with the scan rate of 100 mV/s. The electrode was not scanned over the reduction potential range since it has been known that the sulfur-gold bond could be broken by applying high external potential. Therefore our EQCM studies were focused on the oxidation potential ranges.

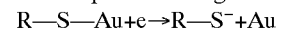

R—S—Au+e→R—S⁻+Au

The way to overcome this problem, as carried out in the next experiment, was increasing the total concentration of electrolyte. In this case, as the electrolyte concentration was increased from $10^{-4}$M to 0.1 M and the electrode was scanned over the potential range from 0 to 600 mV, a new, irreversible peak appeared around 450 mV vs. SCE, which could be associated with the amine functional groups on the surface of dendrimer molecules. It has been known in the literature that electrochemical oxidation of aliphatic amines was irreversible in aqueous solution. The oxidized amino group, in this case should be a radical cation, and this electrochemical reaction can proceed faster in the environment of oxygen and water. It was not unusual to observe the nonsymmetric pattern of the redox processes for dendrimer. These side reactions make the electrochemistry of dendrimer on gold electrode surface a complex case.

After studying the electrochemical behavior of dendrimer molecules adsorbed onto the gold electrodes in the presence of supporting electrolytes, we then investigated the electrochemistry of the dendrimer-modified electrodes in contact with electrochemically-active copper(II) ions in solution.

Figure 24:
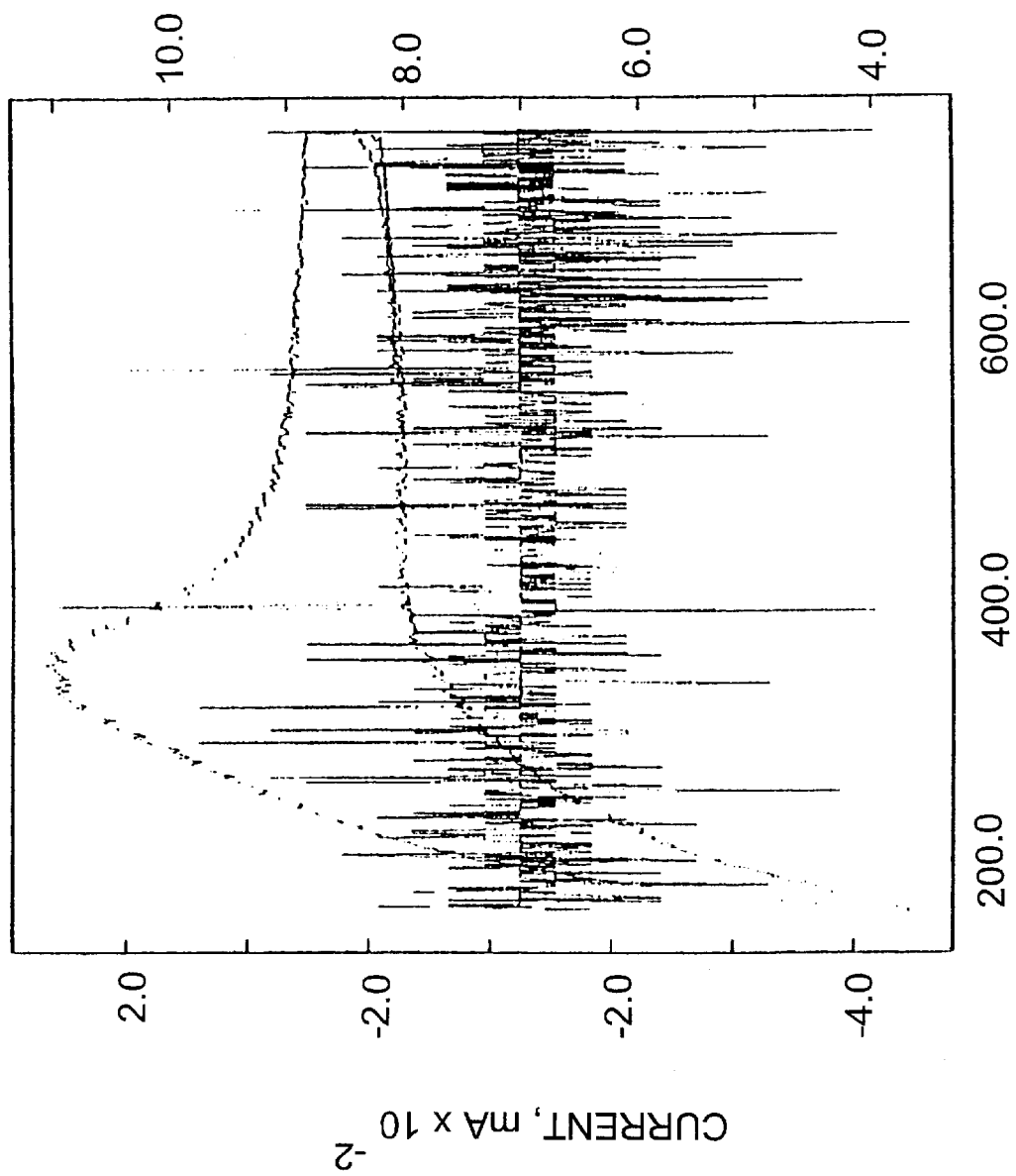
FIG. 24 shows the electrochemical quartz crystal microbalance result when a $Cu(NO_3)_2$ solution was added to the electrolyte in the presence of a dendrimer-modified electrode.

The PAMAM dendrimers have multiple amino and amide chelating groups similar to EDTA. Therefore, the dendrimer should be a good chelating reagent for metal ions as has been previously reported. The chelation of metal ions inside a dendrimer has potential importance in both analytical chemistry and catalysis. We also planned to study the chelation of metal ion as the preliminary step for bioconjugation applications. FIG. 24 shows the EQCM result when a $Cu(NO_3)_2$ solution was added to the electrolyte in the presence of a dendrimer-modified electrode. The initial scan only detected the oxidation of amino functional groups of dendrimer, and no electrochemistry associated with the Cu(II) ions. It was most likely believed that the Cu(II) ion has to diffuse through dendrimer multilayers. The concentration of Cu(II) ions in this initial experiment was too low and most ions were strongly binding to the terminal amino functional groups of dendrimer molecules. For those copper ion coordinated to the dendrimer, they may be too far away from the electrode to undergo redox reactions. Therefore there was no sign of Cu(II) redox signal at the beginning of addition of $Cu(NO_3)_2$ solution.

Figure 25:
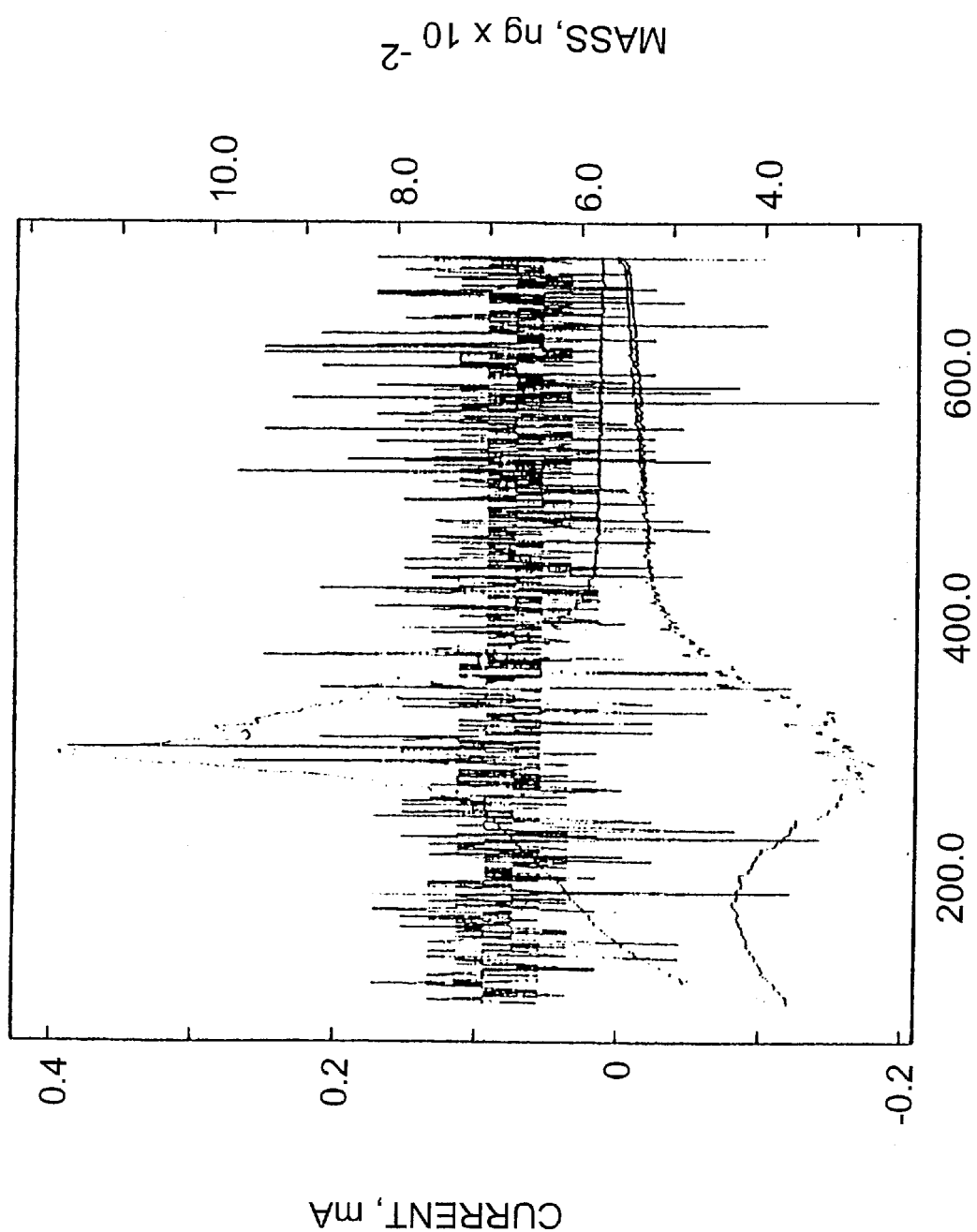
FIG. 25 shows the electrochemical quartz crystal microbalance voltammetry result when additional Cu(II) was added to the solution of FIG. 23.

If this were true, as more Cu(II) was added to the solution, the redox signal of Cu(II) chelation should appear. Indeed, as shown in FIG. 25, the redox signal of Cu(II) chelation was identified by the nearly symmetric redox peaks centered around 300 mV. The cyclic voltammagram shown in FIG. 25 was reversible, which indicated that the chelated Cu(II) was electrochemically stable and transported electron very fast under these conditions. This result supported that the presence of Cu(II)-dendrimer chelating complex, which presumably has octahedral structure like the $Cu(EDTA)^{2-}$. After careful inspection of the cyclic voltammagram in FIG. 25, the second peak was observed as a relatively broader peak also centered around 300 mV. This extra oxidation peak could be attributed to the oxidation of amino functional groups of the cystamine dendrimer molecules. The position of the sharp peak was shifted to lower value. This could be due to the chelating of metal ion into the amino groups of dendrimer. The charge migration through the strong binding Cu(II) ion and the oxidation state of amino group was lowered by this stabilization. The high value of current shown in the same figure was explained by the facilitation charge transfer process of incorporated Cu(II) complex. As expected, no changes in mass were observed during the collection of the date for the CV of the dendrimer-copper complexes.

Figure 26:
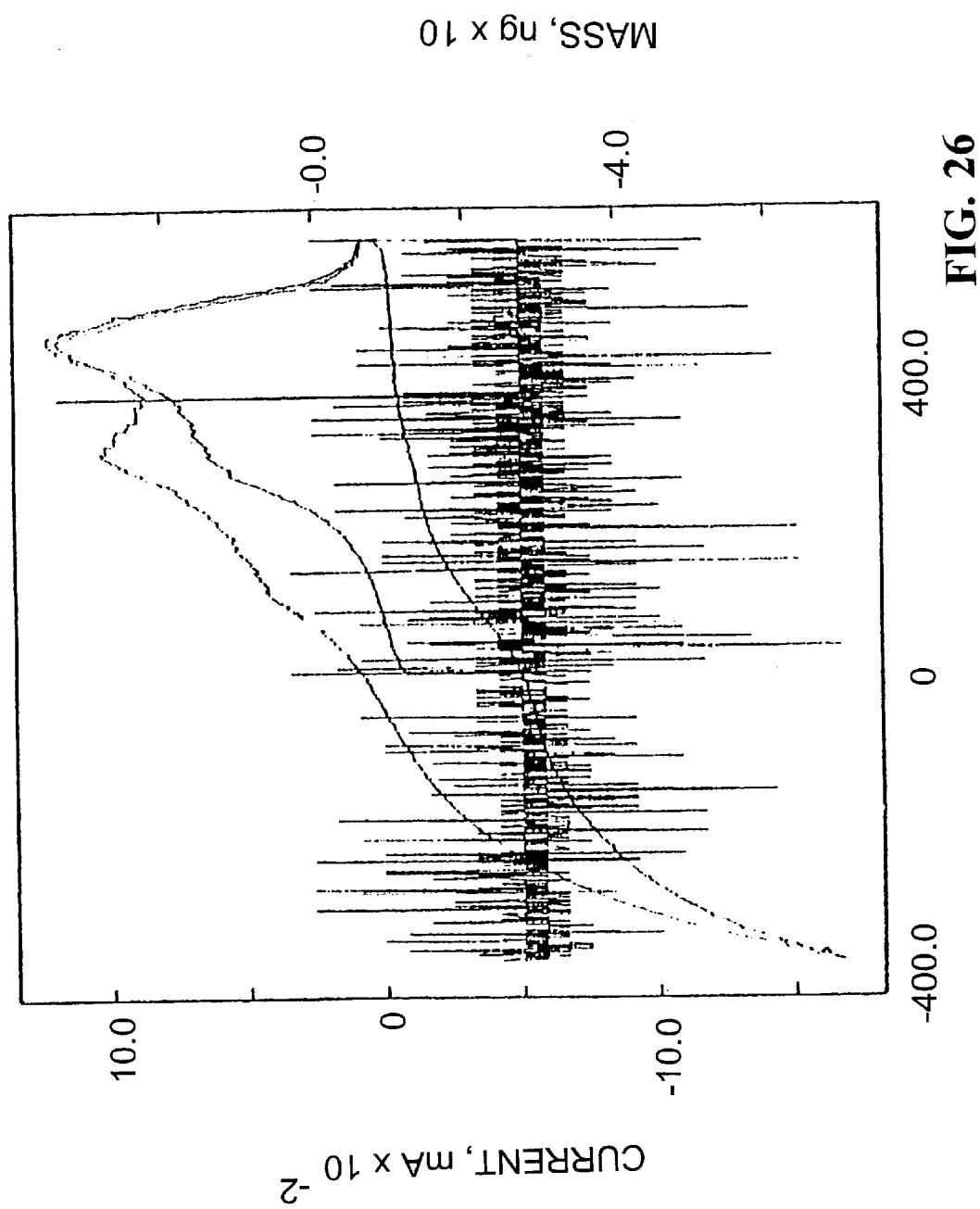
FIG. 26 shows the effects on the voltammetry results when the concentration of Cu(II) in the electrolyte solution and the chemical potential ranges are both further increased.

Further increasing both the concentration of Cu(II) in electrolyte solution and also increasing the electrochemical potential ranges scanned resulted in the cyclic voltammagrams becoming more complex as shown in FIG. 26. The cyclic voltammagram of two more scans further supported the incorporation of Cu(II) ion inside the cystamine dendrimer molecules. During the first scan in the positive direction only two oxidation peaks were detected and free Cu(II) ions were observed at close to the zero potentials. The appearance of oxidation peaks demonstrated the existence of Cu(II)-dendrimer complex and some free amine functional groups of dendrimer molecules. It should be pointed out that the Cu(II) ion could be deposited on top of the gold electrode when the applied potential was negative enough. As the scan went negative in potential, a small feature in the scan indicates a new reductive process taking place occurring around 0 V versus SCE. This feature has a corresponding feature seen during the scan in the oxidative direction. The first oxidation observed during the first scan increased in intensity during the second scan. The second scan showed that there were some free copper ions besides the bound Cu(II) either in the solution or close to the surface of gold electrode after a full cycle of oxidation and reduction. Cu(II) ions generated by electrochemical means free of any amino functional groups binding can exist in the aqueous solution. Therefore dendrimer electrochemical analysis can detect different states of a metal ion. Also, the tailing during the reductive scan is not associated with degradation of the self-assembled dendrimer film, since no mass loss was observed by the QCM.

FORMATION OF A REDOX-REVERSIBLE DENDRIMER GEL

Experiments

A 5 mg quantity (in 137 $\mu$L of water) of generation five ethylene diamine-core PAMAM dendrimer is placed in 863 $\mu$L of 50 mM borate buffer of pH 8.5. A 12 mg quantity of 2-iminothiolane (Traut's reagent) dissolved in 200 $\mu$L of the same buffer is added to the dendrimer solution. Incubation is conducted at room temperature, after which, the reaction mixture is passed over a 1×30 cm G-25 Sephadex column equilibrated with water. The column is connected to an ISCO V-4 detector set at 230 nm. The first peak is collected, concentrated to less than 500 $\mu$L on Centricon 30 units, and passed over the same column again. The first peak is collected (approx. 4 mL) and analyzed for sulfhydryl content using Ellman's reagent by placing 250 $\mu$L of the dendrimer solution in 2.5 mL of 0.1 M $Na^2HPO_4$ of pH 8.0 and *ereating the sample with 50 $\mu$L of a 4 mg/mL solution of Ellman's reagent in the same buffer. After a ten minute incubation, an absorbance reading is taken at 412 nm and the optical density is converted into sulfhydryl concentration by using a molar absorptivity of 14150 $M^{-1}cm^{-1}$. Sulfhydryl content determined for this reaction was approx. 17 SH per dendrimer. The 4 mL of dendrimer solution was split into two equal halves. One was treated with 1 $\mu$L of triethanolamine (TEA), shaken with headspace atmospheric air for 1 h, and evaporated to dryness on a rotoevaporator. The resultant white solid was resuspended in water. Even after vigorous prolonged shaking, the solid would not dissolve. The other half of the sulfhydryl-modified dendrimer was also subjected to the same treatment. After resuspension in water, the solid was treated with approx. 10 mg of dithiothreitol. The white solid became translucent after several minutes of shaking and completely dissolved after 5 minutes of vigorous shaking.

Results

The thiol modified dendrimer which was submitted to aerobic oxidation with atmospheric oxygen appeared to crosslink and form a water insoluble gel. The interdendrimer linkages are likely to be composed of disulfide bridges, thereby forming a gel network composed of dendrimers. Since the gel crosslinks are composed of disulfides, they can easily be reduced under mild conditions with a reductant such as dithiothreitol. Treatment of the dendrimer gel with dithiothreitol does cause dissolution and thereby exhibits an example of a redox reversible gel composed of dendritic molecules. Such gels may find application in fields such as drug delivery where a solid (the dendrimer gel) with a binding capacity for guests (e.g., a therapeutic drug bound within the interior of an individual dendrimer) can be deposited in a specific location in the patient. Endogenous biological reductants may gradually dissolve the dendrimer gel, thereby allowing escape of soluble dendrimer from the insoluble matrix. One can envision that the soluble dendrimer component can either release the drug in a second time release or act as a carrier to deliver the drug to specific targets.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A dendritic polymer having a core containing a disulfide moiety and at least two dendrons emanating from the core, each dendron having at least two terminal groups.

2. The dendritic polymer of claim 1, wherein the core is a polyamine compound containing a disulfide moiety.

3. The dendritic polymer of claim 2, wherein the polyamine compound is a diamine.

4. The dendritic polymer of claim 3, wherein the diamine is cystamine.

5. The dendritic polymer of claim of 1, wherein the dendrons are polyamidoamine dendrons.

6. A dendritic polymer having a core and a plurality of dendrons emanating from the core, each of the dendrons having branch arms which include a disulfide moiety which is essentially inert under non-reducing conditions, but which when subjected to a reducing agent will react with the reducing agent to form a dendritic polymer having sulfhydryl terminal groups.

7. The dendritic polymer of claim 6, wherein the disulfide moieties comprise the terminal groups of the branch arms.

8. A thin film coated substrate comprising a substrate which has been subjected to application of ions or ionizable compounds of the same charge over the surface of the substrate, and one or more layers of organic materials which in each layer contain ions of the same charge, the ions of the layer immediately adjacent the substrate having the opposite charge of the modified substrate and, in the case of further layers, each further layer having a charge opposite that of the previous layer, and at least one of the layers comprising a dendritic polymer.

9. The thin film coated substrate of claim 8, wherein at least one of the layers comprises a dendritic polymer having a core containing a disulfide moiety.

10. A quartz crystal electrode comprising a metal coated quartz crystal electrode subjected to application of a dendritic polymer coating.

11. The quartz crystal electrode of claim 10, wherein the dendritic polymer coating comprises a monolayer of dendritic polymer molecules.

12. The quartz crystal electrode of claim 10, wherein the dendritic polymer has a core with a disulfide moiety.

13. The quartz crystal electrode of claim 10, wherein the dendritic polymer is a polyamidoamine dendrimer having a core with a disulfide moiety.

14. The quartz crystal electrode of claim 10, wherein the dendritic polymer is a polyamidoamine dendrimer having a cystamine core.

15. A differentiated dendritic polymer having a core with a disulfide moiety and at least two dendrons emanating from the core, each of the dendrons having at least two terminal groups, at least one of the dendrons having terminal groups that are different from those of the other dendron.

16. The differentiated dendritic polymer of claim 15, wherein a first dendron is of a different generation than a second dendron.

17. A method of making a dendritic polymer having a core with a disulfide moiety and a plurality of dendrons emanating from the core, comprising:

providing a core molecule having a disulfide moiety and a plurality of reactive terminal groups; and reacting the terminal groups of the core molecule with a plurality of dendrons, each dendron having a single reactive group which bonds to one of the reactive terminal groups of the core molecule.

18. The method of claim 17, wherein the core is a polyamine compound containing a disulfide moiety.

19. The method of claim 18, wherein the polyamine compound is a diamine.

20. The method of claim 19, wherein the diamine is cystamine.

21. A method of making a dendritic polymer having a core with a disulfide moiety and a plurality of dendrons emanating from the core, comprising:

providing a core molecule having a disulfide moiety and a plurality of reactive terminal groups;

reacting the terminal groups of the core molecule with a first reagent to form a $-\frac{1}{2}$ generation dendrimer, each molecule of the fit reagent having at least a single reactive site which bonds with one of the reactive terminal groups of the core molecule and at least one reactive moiety which becomes a terminal reactive moiety on the $-\frac{1}{2}$ generation dendrimer;

reacting each of the terminal reactive moieties on the $-\frac{1}{2}$ generation dendrimer with a second reagent to form a zero generation dendrimer, each molecule of the second reagent including at least one reactive site which bonds with a terminal reactive moiety on the $-\frac{1}{2}$ generation dendrimer and at least one reactive site which becomes a terminal reactive moiety on the zero generation dendrimer; and optionally employing additional reagents to synthesize a dendritic polymer of a desired generation.

22. The method of claim 21, wherein the core is a polyamine compound containing a disulfide moiety.

23. The method of claim 22, wherein the polyamine compound is a diamine.

24. The method of claim 23, wherein the diamine is cystamine.

25. The method of claim 21, wherein the dendrons are polyamidoamine dendrons.

26. The method of claim 25, wherein an iterative excess reagent technique, alternately employing excess amounts of methyl acrylate and ethylene diamine, is employed.

27. A method of making a dendritic polymer having a core and a plurality of dendrons emanating from the core, each of the dendrons having branched arms which include a disulfide moiety, comprising:

providing a dendritic polymer having reactive terminal groups; and reacting the terminal groups of the dendritic polymer with a monomer having a disulfide moiety, each of the monomer molecules including a reactive site which bonds with one of the reactive terminal groups of the dendritic polymer.

28. The method of claim 27, wherein the disulfide moieties comprise the termninal groups of the branched arms.

29. The method of claim 27, wherein each of the monomer molecules bonded to the dendritic polymer includes additional reactive sites, and the method further comprises subsequently employing divergent dendritic polymer synthesis techniques to form dendritic polymers having internal disulfide branch cells.

30. A method of making a thin film coated substrate, comprising:

providing a substrate which has been modified by application of ions or ionizable compounds of the same charge over the surface of the substrate; and applying one of more layers made of organic materials, the organic materials in each layer having ions of the same charge, the organic materials being applied from a solution of the organic materials to the substrate which has been modified, the organic material for the first layer having ions of the opposite charge relative to the charge of the ions of the substrate which has been modified and, in the case of further layers, each further layer containing ions of opposite charge relative to the charge of the ions in the previous layer, at least one of the layers comprising a dendritic polymer.

31. The method of claim 30, wherein at least one of the layers comprises a dendritic polymer having a core containing a disulfide moiety.

32. A method of forming a differentiated dendritic polymer, comprising:

providing a first dendritic polymer having a core with a disulfide moiety and at least two dendrons emanating from the core, each of the dendrons having at least two terminal groups;

providing a second dendritic polymer having a core with a disulfide moiety and a plurality of dendrons emanating from the core, each of the dendrons of the second dendritic polymer having at least two terminal groups;

combining and subjecting the first and second dendritic polymers to reducing conditions to form a mixture of two different types of dendritic molecules, each having a single reactive sulfhydryl group; and subjecting the mixture to aerobic, oxidizing conditions to form a mixture containing the first and second dendritic polymers, and a differentiated dendritic polymer comprised of a part of each of the original first and second dendritic polymers.

33. The method of claim 32, wherein the first and second dendritic polymers are of different generations.

34. A gel comprised of crosslinked dendritic polymers, comprising:

dendritic polymers, each having sulfhydryl terminal groups which react with sulfhydryl terminal groups of another dendritic polymer to form a crosslinked gel.

35. The gel of claim 34, wherein the dendritic polymer is the reaction product of a dendritic polymer having amine terminal groups and iminothiolane.

36. The gel of claim 35, wherein the dendritic polymer is a polyamidoamine dendrimer.

37. The gel of claim 34, wherein the dendritic polymer was prepared by subjecting a dendritic polymer having sulfide moieties to oxidizing conditions.

38. The gel of claim 34, wherein the crosslinked dendritic polymer gel can be resolubilized upon addition of a reducing agent to provide a redox reversible gel.

39. The gel of claim 38, wherein the reducing agent is dithiothreitol.

40. A dendritic polymer conjugate comprising a dendritic polymer having a sulfhydryl group and a first carried material having a sulfhydryl-reactive group, conjugated to the dendritic polymer at the sulfhydryl group.

41. The conjugate of claim 40, wherein the dendritic polymer includes surface functional groups, and the dendritic polymer is conjugated to a second carried material through the surface functional groups.

42. The conjugate of claim 41, wherein at least one of the first and second carried materials is a bioactive agent.

43. The conjugate of claim 42, wherein the bioactive agent is selected from the group consisting of pharmaceutical agents, drugs, pharmaceutical intermediaries, radioprotective agents, toxins, antibodies, antibody fragments, hormones, biological responses modifiers, scavenging agents, immuno-potentiating agents, genetic materials, antigens, polypeptides, proteins and combinations thereof.

44. The conjugate of claim 41, wherein at least one of the first and second carried materials is an oligonucleotide.

45. The conjugate of claim 40, wherein the sulfhydryl group is derived from a disulfide core.

46. The conjugate of claim 40, wherein the dendritic polymer is a polyamidoamine dendrimer.

47. The conjugate of claim 41, wherein the second carried material is a bioactive agent, a signal amplifier, or a combination thereof.

48. The conjugate of claim 41, wherein the second carried material is selected from the group consisting of pharmaceutical agents, drugs, pharmaceutical intermediaries, radioprotective agents, toxins, antibodies, antibody fragments, hormones, biological responses modifiers, scavenging agents, immuno-potentiating agents, genetic materials, antigens, polypeptides, proteins and combinations thereof.

49. The conjugate of claim 41, wherein the second carried material is triethyltinpropanate.

* * * * *